US010440756B2

(12) United States Patent
Zhang et al.

(10) Patent No.: US 10,440,756 B2
(45) Date of Patent: Oct. 8, 2019

(54) TECHNIQUES FOR DOWNLINK SCHEDULING AND UPLINK SCHEDULING IN A SHARED RADIO FREQUENCY SPECTRUM BAND

(71) Applicant: QUALCOMM Incorporated, San Diego, CA (US)

(72) Inventors: Lei Zhang, Bridgewater, NJ (US); Chong Li, Weekawken, NJ (US); Xinzhou Wu, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/837,803

(22) Filed: Dec. 11, 2017

(65) Prior Publication Data

US 2018/0116001 A1    Apr. 26, 2018

Related U.S. Application Data

(62) Division of application No. 14/880,543, filed on Oct. 12, 2015, now Pat. No. 9,877,344.

(51) Int. Cl.
*H04W 72/00* (2009.01)
*H04W 74/08* (2009.01)
(Continued)

(52) U.S. Cl.
CPC ....... *H04W 74/0866* (2013.01); *H04L 5/0053* (2013.01); *H04L 5/0091* (2013.01);
(Continued)

(58) Field of Classification Search
None
See application file for complete search history.

(56) References Cited

U.S. PATENT DOCUMENTS 8,817,623 B2   8/2014 Gupta et al.
9,113,483 B2   8/2015 Zou et al.
(Continued)

OTHER PUBLICATIONS

Intel Corporation, "Uplink Transmission for LAA," 3GPP TSG-RAN WG2 Meeting #90, R2-152214, Fukuoka, Japan, May 25-29, 2015, 5 pgs., XP050973839, 3rd Generation Partnership Project.
(Continued)

*Primary Examiner* — Erika A Washington
(74) *Attorney, Agent, or Firm* — Holland & Hart LLP

(57) ABSTRACT

Methods, systems, and devices are described for techniques for downlink (DL) scheduling and uplink (UL) scheduling in a shared radio frequency (RF)spectrum band. In some aspects, a wireless communication device may receive an UL data transmission grant associated with a channel of shared RF spectrum band. The wireless communication device may perform a channel readiness procedure associated with the channel. The wireless communication device may also transmit channel readiness information based at least in part on the channel readiness procedure to a base station. The channel readiness information may be transmitted via an uplink channel of a licensed RF spectrum band different from the shared RF band. In other aspects, a base station may schedule a data transmission on one or more channels of a shared RF spectrum band. The base station may transmit a data transmission grant for the scheduled data transmission to a wireless communication device.

17 Claims, 21 Drawing Sheets

(51) Int. Cl.
    *H04W 16/14*   (2009.01)
    *H04W 74/00*   (2009.01)
    *H04W 72/12*   (2009.01)
    *H04L 5/00*    (2006.01)

(52) U.S. Cl.
    CPC ....... *H04W 16/14* (2013.01); *H04W 72/1215* (2013.01); *H04W 74/004* (2013.01); *H04W 74/0808* (2013.01); *H04L 5/001* (2013.01)

(56) References Cited

U.S. PATENT DOCUMENTS

| | | |
|---|---|---|
| 2014/0044105 A1 | 2/2014 | Bontu et al. |
| 2014/0362780 A1* | 12/2014 | Malladi ................ H04W 16/14 370/329 |
| 2015/0023315 A1 | 1/2015 | Yerramalli et al. |
| 2015/0049732 A1* | 2/2015 | Xue .................... H04L 1/1854 370/330 |
| 2015/0092702 A1 | 4/2015 | Chen et al. |
| 2015/0099525 A1 | 4/2015 | Ji et al. |
| 2015/0119101 A1 | 4/2015 | Cui et al. |
| 2015/0172950 A1 | 6/2015 | Chen et al. |
| 2015/0181453 A1 | 6/2015 | Chen et al. |
| 2015/0215471 A1 | 7/2015 | Ljung |
| 2015/0223075 A1 | 8/2015 | Bashar et al. |
| 2015/0349931 A1* | 12/2015 | Damnjanovic ....... H04L 5/0007 370/280 |
| 2016/0135189 A1* | 5/2016 | Chandrasekhar ............. H04W 72/0453 370/329 |
| 2016/0278050 A1* | 9/2016 | Nory .................... H04W 16/14 |
| 2017/0105233 A1 | 4/2017 | Zhang et al. |

OTHER PUBLICATIONS

ISA/EP, International Search Report and Written Opinion of the International Searching Authority, Int'l Application No. PCT/US2016/048863, Nov. 16, 2016, European Patent Office, Rijswijk, NL, 14 pgs.

LG Electronics, "Candidate Solutions for LAA Operation," 3GPP TSG RAN WG1 Meeting #78bis, R1-144042, Ljubljana, Slovenia, Oct. 6-10, 2014, 6 pgs., XP050869704, 3rd Generation Partnership Project.

* cited by examiner

TECHNIQUES FOR DOWNLINK SCHEDULING AND UPLINK SCHEDULING IN A SHARED RADIO FREQUENCY SPECTRUM BAND

CROSS REFERENCES

The present Application for Patent is a Divisional of pending U.S. patent application Ser. No. 14/880,543 by Zhang et al., entitled "Techniques for Downlink Scheduling and Uplink Scheduling in a Shared Radio Frequency Spectrum Band," filed Oct. 12, 2015, assigned to the assignee hereof. The above application is incorporated herein by reference for all purposes, in its entirety.

BACKGROUND

Field of the Disclosure

The present disclosure, for example, relates to wireless communication systems, and more particularly to techniques for downlink scheduling and uplink scheduling in a shared radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Certain wireless multiple-access communication systems may utilize networks or other systems operating in an unlicensed or shared radio frequency spectrum band to offload certain transmissions. In such cases, coexistence and/or integration challenges arise between the multiple-access communication system and the unlicensed or shared radio frequency spectrum band network or system.

SUMMARY

The described features generally relate to one or more improved methods, systems, or devices that provide for techniques for downlink scheduling and uplink scheduling in a shared radio frequency spectrum band. In some aspects of the present disclosure, a wireless communication device (e.g., a UE) may receive an uplink data transmission grant from a base station (e.g., an evolved Node B (eNB) or the like). The uplink data transmission grant is associated with a wireless channel of a shared radio frequency spectrum band (e.g., such as a channel(s) of a Wi-Fi network). The wireless communication device may perform a channel readiness procedure (e.g., a clear channel assessment (CCA)) associated with the wireless channel. The wireless communication device may transmit channel readiness information based at least in part on the channel readiness procedure to the base station. The channel readiness information that is associated with the wireless channel of the shared radio frequency spectrum band is transmitted via an uplink wireless channel of a licensed RF spectrum band (e.g., an LTE link) different from the shared radio frequency band.

In accordance with other aspects of the present disclosure, a base station (e.g., an eNB or the like) may schedule a data transmission on one or more wireless channels of a shared radio frequency spectrum band (e.g., such as a channel(s) of a Wi-Fi network). The base station may transmit a data transmission grant for the scheduled data transmission to a wireless communication device (e.g., a UE). The data transmission grant may be transmitted via a downlink channel of a licensed radio frequency spectrum band (e.g., an LTE link) different from the shared radio frequency band.

A method of wireless communication is described. The method may include receiving, by a wireless communication device, an uplink (UL) data transmission grant associated with a channel of shared radio frequency (RF) spectrum band, performing, by the wireless communication device, a channel readiness procedure associated with the channel and transmitting channel readiness information based at least in part on the channel readiness procedure to a base station, the channel readiness information being transmitted via an UL channel of a licensed RF spectrum band different from the shared RF band.

An apparatus for wireless communication is described. The apparatus may include means for receiving, by a wireless communication device, an UL data transmission grant associated with a channel of shared RF spectrum band, means for performing, by the wireless communication device, a channel readiness procedure associated with the channel and means for transmitting channel readiness information based at least in part on the channel readiness procedure to a base station, the channel readiness information being transmitted via an UL channel of a licensed RF spectrum band different from the shared RF band.

A further apparatus is described. The apparatus may include a processor, memory in electronic communication with the processor, and instructions stored in the memory. The instructions may be operable to cause the processor to receive, by a wireless communication device, an UL data transmission grant associated with a channel of shared RF spectrum band, perform, by the wireless communication device, a channel readiness procedure associated with the channel and transmit channel readiness information based at least in part on the channel readiness procedure to a base station, the channel readiness information being transmitted via an UL channel of a licensed RF spectrum band different from the shared RF band.

A non-transitory computer readable medium for wireless communication is described. The non-transitory computer-readable medium may include instructions to cause a processor to receive, by a wireless communication device, an UL data transmission grant associated with a channel of shared RF spectrum band, perform, by the wireless communication device, a channel readiness procedure associated with the channel and transmit channel readiness information based on the channel readiness procedure to a base station, the channel readiness information being transmitted via an UL channel of a licensed RF spectrum band different from the shared RF band.

Some examples of the method, apparatus, or non-transitory computer-readable medium described above may further include processes, features, means, or instructions for determining that the channel is available based on the channel readiness procedure. Some examples of the method, apparatus, or non-transitory computer-readable medium described above may further include processes, features, means, or instructions for transmitting data via the channel based on the determination that the channel is available.

Some examples of the method, apparatus, or non-transitory computer-readable medium described above may further include processes, features, means, or instructions for determining that the channel is unavailable based on the channel readiness procedure. Some examples of the method, apparatus, or non-transitory computer-readable medium described above may further include processes, features, means, or instructions for delaying transmission of data via the channel based on the determination that the channel is unavailable.

In some examples of the method, apparatus, or non-transitory computer-readable medium described above, the UL data transmission grant is received prior to performing the channel readiness procedure.

In some examples of the method, apparatus, or non-transitory computer-readable medium described above, the UL data transmission grant is received after the transmission of the channel readiness information to the base station.

Some examples of the method, apparatus, or non-transitory computer-readable medium described above may further include processes, features, means, or instructions for transmitting data via the channel concurrently with the transmission of the channel readiness information to the base station.

Some examples of the method, apparatus, or non-transitory computer-readable medium described above may further include processes, features, means, or instructions for transmitting data via the channel after the transmission of the channel readiness information to the base station.

Some examples of the method, apparatus, or non-transitory computer-readable medium described above may further include processes, features, means, or instructions for monitoring, by the wireless communication device, the channel of the shared RF spectrum band to obtain subsequent channel readiness information. Some examples of the method, apparatus, or non-transitory computer-readable medium described above may further include processes, features, means, or instructions for transmitting the subsequent channel readiness information to the base station, the subsequent channel readiness information being transmitted via the UL channel of the licensed RF spectrum band.

Some examples of the method, apparatus, or non-transitory computer-readable medium described above may further include processes, features, means, or instructions for reserving the channel of the shared RF spectrum band.

In some examples of the method, apparatus, or non-transitory computer-readable medium described above, the licensed RF spectrum band is a long term evolution (LTE) RF spectrum band.

A method of wireless communication is described. The method may include scheduling, by a base station, a data transmission on one or more channels of a shared RF spectrum band and transmitting a data transmission grant for the scheduled data transmission to a wireless communication device, the data transmission grant being transmitted via a downlink (DL) channel of a licensed RF spectrum band different from the shared RF band.

An apparatus for wireless communication is described. The apparatus may include means for scheduling, by a base station, a data transmission on one or more channels of a shared RF spectrum band and means for transmitting a data transmission grant for the scheduled data transmission to a wireless communication device, the data transmission grant being transmitted via a DL channel of a licensed RF spectrum band different from the shared RF band.

A further apparatus is described. The apparatus may include a processor, memory in electronic communication with the processor, and instructions stored in the memory. The instructions may be operable to cause the processor to schedule, by a base station, a data transmission on one or more channels of a shared RF spectrum band and transmit a data transmission grant for the scheduled data transmission to a wireless communication device, the data transmission grant being transmitted via a DL channel of a licensed RF spectrum band different from the shared RF band.

A non-transitory computer readable medium for wireless communication is described. The non-transitory computer-readable medium may include instructions to cause a processor to schedule, by a base station, a data transmission on one or more channels of a shared RF spectrum band and transmit a data transmission grant for the scheduled data transmission to a wireless communication device, the data transmission grant being transmitted via a DL channel of a licensed RF spectrum band different from the shared RF band.

Some examples of the method, apparatus, or non-transitory computer-readable medium described above may further include processes, features, means, or instructions for receiving channel readiness information associated with the one or more channels from the wireless communication device, the channel readiness information being received via an UL channel of the licensed RF spectrum band.

In some examples of the method, apparatus, or non-transitory computer-readable medium described above, the data transmission grant is associated with an UL data transmission of the wireless communication device, the method further comprising: determining the data transmission grant based on the received channel readiness information.

In some examples of the method, apparatus, or non-transitory computer-readable medium described above, the data transmission grant is associated with a DL data transmission to the wireless communication device, the method further comprising: determining that the one or more channels are unavailable based on the received channel readiness information. Some examples of the method, apparatus, or non-transitory computer-readable medium described above may further include processes, features, means, or instructions for delaying the transmission of the data transmission grant.

Some examples of the method, apparatus, or non-transitory computer-readable medium described above may further include processes, features, means, or instructions for transmitting the data transmission grant associated with the one or more channels regardless of a readiness of the one or more channels at a time the data transmission is scheduled.

Some examples of the method, apparatus, or non-transitory computer-readable medium described above may further include processes, features, means, or instructions for transmitting information associated with the data transmission grant to the wireless communication device, the information being transmitted via the DL channel of the licensed frequency spectrum band.

In some examples of the method, apparatus, or non-transitory computer-readable medium described above, the information comprises a modulation and coding scheme (MCS), sub-band assignments, or a combination thereof.

In some examples of the method, apparatus, or non-transitory computer-readable medium described above, the licensed RF spectrum band is long term evolution (LTE) RF spectrum band.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
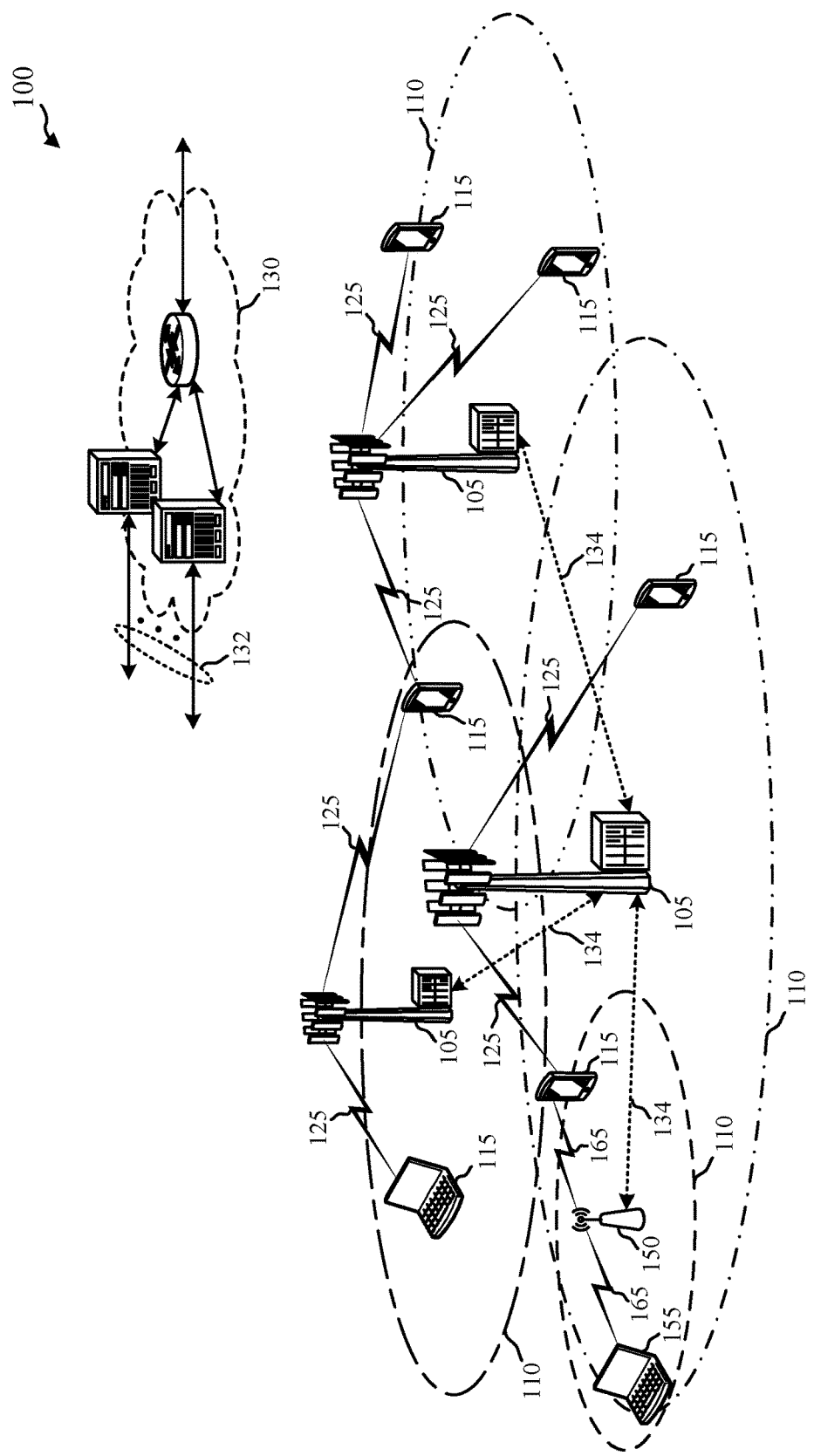
FIG. 1 illustrates an example of a wireless communications system that supports techniques for downlink scheduling and uplink scheduling in a shared radio frequency spectrum band in accordance with various aspects of the present disclosure.

Certain wireless communication systems primarily associated with a licensed radio frequency spectrum band may be configured to utilize and coexist with an unlicensed or shared radio frequency spectrum band network or system (e.g., an 802.11 Wi-Fi system utilizing the 2.4 GHz ISM (Industrial, Scientific and Medical) and/or 5 GHz U-NII (Unlicensed National Information Infrastructure) radio frequency bands). In this regard, a benefit an unlicensed or shared radio frequency spectrum band network or system is the high peak data communication rates available in these networks. However, scheduling downlink and uplink data transmissions for UEs capable of transmitting in both the licensed radio frequency spectrum band as well as the shared radio frequency spectrum band can be problematic due at least in part to differences in channel acquisition and grant procedures between the corresponding networks/systems.

In accordance with aspects of the subject technology, a Long Term Evolution Controlled Wi-Fi (LTE-CW) network environment includes UEs that utilize the licensed spectrum band of an LTE network to improve performance and coverage of an unlicensed or shared frequency spectrum band in a Wi-Fi network. Uplink and downlink data transmission grants for the Wi-Fi network may be transmitted over an LTE link using either LTE data or control channels. For example, an LTE link or carrier (e.g., a low-bandwidth but reliable channel) is used for scheduling Wi-Fi uplink data transmission grants. The UE may perform channel readiness procedure associated with one or more channels of shared frequency spectrum band in the Wi-Fi network, for example, by performing a clear channel assessment (CCA). The UE may provide channel readiness information (e.g., the results of the CCA) to an eNB by transmitting the information via an uplink channel of the LTE link.

In some cases, the UE will have received an uplink data transmission grant prior to performing the channel readiness procedure. In other cases, however, the UE may perform the channel readiness procedure and transmit the channel readiness information to the eNB. The eNB may analyze the channel readiness information from the UE to determine availability of the one or more channels of shared frequency spectrum band in the Wi-Fi network and then transmits the uplink data transmission grant to the UE. In either case, the uplink data transmission grant may be received by the UE via a downlink channel of the LTE link.

In accordance with other aspects of the subject technology, an eNB may schedule a data transmission on one or more wireless channels of the shared radio frequency spectrum band of the Wi-Fi network. This data transmission may be associated with a downlink or an uplink data transmission. The eNB station may transmit a data transmission grant for the scheduled downlink or scheduled uplink data transmission to the UE. The data transmission grant may be transmitted via the downlink channel of the LTE link. The eNB may also receive channel readiness information associated with the one or more wireless channels from the UE. This channel readiness information (associated with the one or more wireless channels of the shared radio frequency spectrum band) is received by the eNB on the uplink channel of the LTE link.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 supporting techniques for downlink (DL) scheduling and uplink (UL) scheduling in a shared radio frequency (RF) spectrum band in accordance with various aspects of the present disclosure. The wireless communications system 100 includes base stations 105, at least one user equipment (UE) 115, and a core network 130. In some examples, the wireless communications system 100 may be a Long Term Evolution (LTE) network, an LTE-Advanced (LTE-A) network, or an LTE-Controlled Wi-Fi (LTE-CW) network.

The core network 130 may provide user authentication, access authorization, tracking, interne protocol (IP) connectivity, and other access, routing, or mobility functions. The base stations 105 interface with the core network 130 through backhaul links 132 (e.g., S1, etc.). Base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

Base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, an evolved NodeB (eNB), a Home NodeB, a Home eNodeB, or some other suitable terminology. The wireless communications system 100 may include base stations 105 of different types (e.g., macro or small cell base stations). There may be overlapping geographic coverage areas 110 for different technologies. The communication links 125 shown in wireless communications system 100 may include UL transmissions from a UE 115 to a base station 105, or DL transmissions, from a base station 105 to a UE 115.

UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a wireless local loop (WLL) station, a machine type communication (MTC) device, or the like. A UE may be able to communicate with various types of base stations and network equipment including macro eNBs, small cell eNBs, relay base stations, and the like.

In some examples of the wireless communications system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Both the PSS and the SSS may be located in the central 62 and 72 subcarriers of a carrier, respectively. In some cases, PSS, SSS, and other signals such as cell specific reference signals (CRS) for channel estimation may be configured according to a reduced periodicity transmission schedule to conserve energy or reduce inter-cell interference. Such a configuration may be known as a discovery reference signal (DRS) configuration.

A UE 115 may enter an idle mode and us discontinuous reception (DRX) to reduce power consumption in the idle mode. In DRX operation, the UE is configured to periodically wake up to receive paging messages according to a DRX cycle, which may be a default DRX cycle for the cell or a UE-specific DRX cycle. The UE determines paging frames for which it will wake up to check for paging messages according to the DRX cycle and a UE-specific identifier determined from the unique international mobile subscriber identity (IMSI) assigned to the UE 115. The UE 115 checks specific paging occasions, which are subframes within the paging frame determined according to the DRX cycle and the UE-specific identifier. If the serving gateway (S-GW) receives data for the UE 115, it may notify the mobility management entity (MME), which may send a paging message to every base station 105 within an area known as a tracking area. Each base station 105 within the tracking area may send a paging message to the UE 115 during a paging occasion. Thus, the UE may remain in idle without updating the MME until it leaves the tracking area.

In some cases, a UE 115 may be configured in connected mode DRX. In connected mode DRX, a DRX cycle consists of an "On Duration" when the UE 115 may monitor for control information (e.g., on physical downlink control channel (PDCCH)) and a "DRX period" when the UE115 may power down radio components. In some cases, a UE 115 may be configured with a short DRX cycle and a long DRX cycle. In some cases, a UE 115 may enter a long DRX cycle if it is inactive for one or more short DRX cycles. The transition between the short DRX cycle, the long DRX cycle and continuous reception may be controlled by an internal timer or by messaging from a base station 105. A UE 115 may receive scheduling messages on PDCCH during the On Duration. While monitoring PDCCH for a scheduling message, the UE 115 may initiate a "DRX Inactivity Timer". If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a "DRX Short Cycle Timer". When the DRX Short Cycle Timer expires, the UE 115 may resume a long DRX cycle.

A base station 105 may insert periodic pilot symbols such as cell-specific reference signals (CRS) to aid UEs 115 in channel estimation and coherent demodulation. CRS may include one of 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block based on the number of antenna ports or layers (up to 4) of the receiving UEs 115. In addition to CRS, which may be utilized by all UEs 115 in the coverage area 110 of the base station 105, demodulation reference signal (DMRS), also called UE-specific reference signals (UE-RS) may be directed toward specific UEs 115 and may be transmitted only on resource blocks assigned to those UEs 115. DMRS may include signals on 6 resource elements in each resource block in which they are transmitted. The DM-RS for different antenna ports may each utilize the same 6 resource elements, and may be distinguished using different orthogonal cover codes (e.g., masking each signal with a different combination of 1 or −1 in different resource elements). In some cases, two sets of DMRS may be transmitted in adjoining resource elements. In some cases, additional reference signals known as channel state information reference signals (CSI-RS) may be included to aid in generating channel state information (CSI). On the UL, a UE 115 may transmit a combination of periodic sounding reference signal (SRS) and UL DMRS for link adaptation and demodulation, respectively.

A base station 105 may gather channel condition information from a UE 115 in order to efficiently configure and schedule the channel. This information may be sent from the UE 115 in the form of a channel state report. A channel state report may contain a rank indicator (RI) requesting a number of layers to be used for DL transmissions (e.g., based on the antenna ports of the UE 115), a precoding matrix indicator (PMI) indicating a preference for which precoder matrix should be used (based on the number of layers), and a channel quality indicator (CQI) representing the highest modulation and coding scheme (MCS) that may be used. CQI may be calculated by a UE 115 after receiving predetermined pilot symbols such as CRS or CSI-RS. RI and PMI may be excluded if the UE 115 does not support spatial multiplexing (or is not in support spatial mode). The types of information included in the report determines a reporting type. Channel state reports may be periodic or aperiodic. That is, a base station 105 may configure a UE 115 to send periodic reports at regular intervals, and may also request additional reports as needed. Aperiodic reports may include wideband reports indicating the channel quality across an entire cell bandwidth, UE selected reports indicating a subset of the best subbands, or configured reports in which the subbands reported are selected by the base station 105.

In some cases, the wireless communications system 100 may include small cells whose coverage areas 110 may overlap the coverage area 110 of one or more macro base stations 105. In some cases, small cells may be added in areas with high user demand or in areas not sufficiently covered by a macro base station 105. For example, a small cell may be located in a shopping center, or in an area where signal transmissions are blocked by terrain or buildings. In some cases, small cells may improve network performance by allowing macro base stations 105 to offload traffic when load is high. A network that includes both large and small cells may be known as a heterogeneous network. A heterogeneous network may also include Home evolved node B (eNBs) (HeNBs) which may provide service to a restricted group known as a closed subscriber group (CSG). For example, an office building may contain small cells for use only by the occupants of the building. In some cases, heterogeneous networks may involve more complex network planning and interference mitigation techniques than homogenous networks.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The term "component carrier" may refer to each of the multiple carriers utilized by a UE in CA operation, and may be distinct from other portions of system bandwidth. For instance, a component carrier may be a relatively narrow-bandwidth carrier susceptible of being utilized independently or in combination with other component carriers. Each component carrier may provide the same capabilities as an isolated carrier based on release 8 or release 9 of the Long Term Evolution (LTE)

standard. Multiple component carriers may be aggregated or utilized concurrently to provide some UEs 115 with greater bandwidth and, e.g., higher data rates. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode. A carrier used for DL may be referred to as a DL CC, and a carrier used for UL may be referred to as an UL CC. A UE 115 may be configured with multiple DL component carriers (CCs) and one or more UL CCs for carrier aggregation. Each carrier may be used to transmit control information (e.g., reference signals, control channels, etc.), overhead information, data, etc. A UE 115 may communicate with a single base station 105 utilizing multiple carriers, and may also communicate with multiple base stations simultaneously on different carriers. A UE 115 may be configured with multiple DL CCs and one or more UL CCs for carrier aggregation. Carrier aggregation may be used with both frequency division duplexing (FDD) and time division duplexing (TDD) component carriers.

Each cell of a base station 105 includes a CC that may be a DL CC or a TDD CC. The cell may include an UL CC in FDD operation. The coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), e.g., acknowledgement (ACK)/NACK, channel quality indicator (CQI), and scheduling information transmitted on physical uplink control channel (PUCCH), are carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell. In other cases, one or more secondary cell (SCells) may be designated to carry physical uplink control channel (PUCCH), and the SCells may be organized into PUCCH groups based on which CC is used to carry the associated UL control information. Some wireless networks may utilize enhanced CA operations based on a large number of carriers (e.g., between 5 and 32 carriers), operation in unlicensed spectrum, or use of enhanced CCs.

In some cases, configured SCells are activated and deactivated for individual UEs 115 by a configuring cell using a primary carrier (e.g., PCell, etc.). For example, activation and deactivation commands for configured SCells may be carried in MAC signaling. When an SCell is deactivated, the UE 115 does not need to monitor for control information for the SCell, does not need to receive the corresponding DL CC, cannot transmit in the corresponding UL CC, nor is it required to perform channel quality information (CQI) measurements. Upon deactivation of an SCell, the UE may also flush all HARQ buffers associated with the SCell. Conversely, when an SCell is active, the UE 115 receives control information and/or data transmissions for the SCell, and is expected to be able to perform CQI measurements. The activation/deactivation mechanism is based on the combination of a MAC control element and deactivation timers. The MAC control element carries a bitmap for the individual activation and deactivation of SCells such that SCells can be activated and deactivated individually, and a single activation/deactivation command can activate/deactivate a subset of the SCells. One deactivation timer is maintained per SCell but one common value is configured per UE by RRC.

In some cases, a UE 115 or base station 105 may operate in a shared RF spectrum band (e.g., an LTE-CW network). As used herein, the term "shared radio frequency spectrum band" means one or more bands of unlicensed or shared spectrum subject to contention resolution procedures for access to shared frequency resources of the band. Cells operating in shared frequency spectrum bands may be configured to be used in a standalone mode of operation (e.g., used as a primary carrier for one or more UEs), or in a license assisted access (LAA) mode. Other devices may also be operating in the unlicensed or shared frequency spectrum. By way of example, FIG. 1 shows a network comprised of a Wi-Fi access point (AP) 150 in communication with a Wi-Fi only station (STA) 155 and a UE 115 via communication links 165 in unlicensed frequency spectrum.

In some examples, UEs 115 may be configured for CA using a PCell in dedicated spectrum and one or more SCells in a shared frequency spectrum band. UEs 115 or eNBs 105 using LAA cells may utilize listen before talk (LBT) procedures for transmissions in the shared frequency spectrum band. When communicating via an unlicensed cell, devices may perform a clear channel assessment (CCA) prior to communicating in order to determine whether the channel is available. A CCA may include an energy detection procedure to determine whether there are any other active transmissions. For example, the device may infer that a change in a RSSI of a power meter indicates that a channel is occupied. Specifically, signal power is that is concentrated in a certain bandwidth and exceeds a predetermined noise floor may indicate another wireless transmitter. In some cases, a CCA may also include detection of specific sequences that indicate use of the channel (e.g., a signal detect CCA). For example, another device may transmit a specific preamble or other indication of transmission prior to transmitting a data sequence.

In accordance with some aspects (e.g., when wireless communications system 100 is an LTE-CW system or the like, licensed spectrum of an LTE network may be used to improve performance and coverage of the unlicensed or shared RF spectrum band in a Wi-Fi network. For example, an LTE link (e.g., a low-bandwidth but reliable channel) may be used to handle various control procedures and functions (e.g., scheduling and reporting) associated with the coverage/range of the unlicensed or shared frequency spectrum in the Wi-Fi network. In some examples, the data transmission is performed over the Wi-Fi network with control and communication over the LTE link. As such, advantages such as but not limited to a better cost structure for high data rate communication accompanied by more effective scheduling and utilization of the unlicensed or shared frequency spectrum can be realized.

Figure 2:
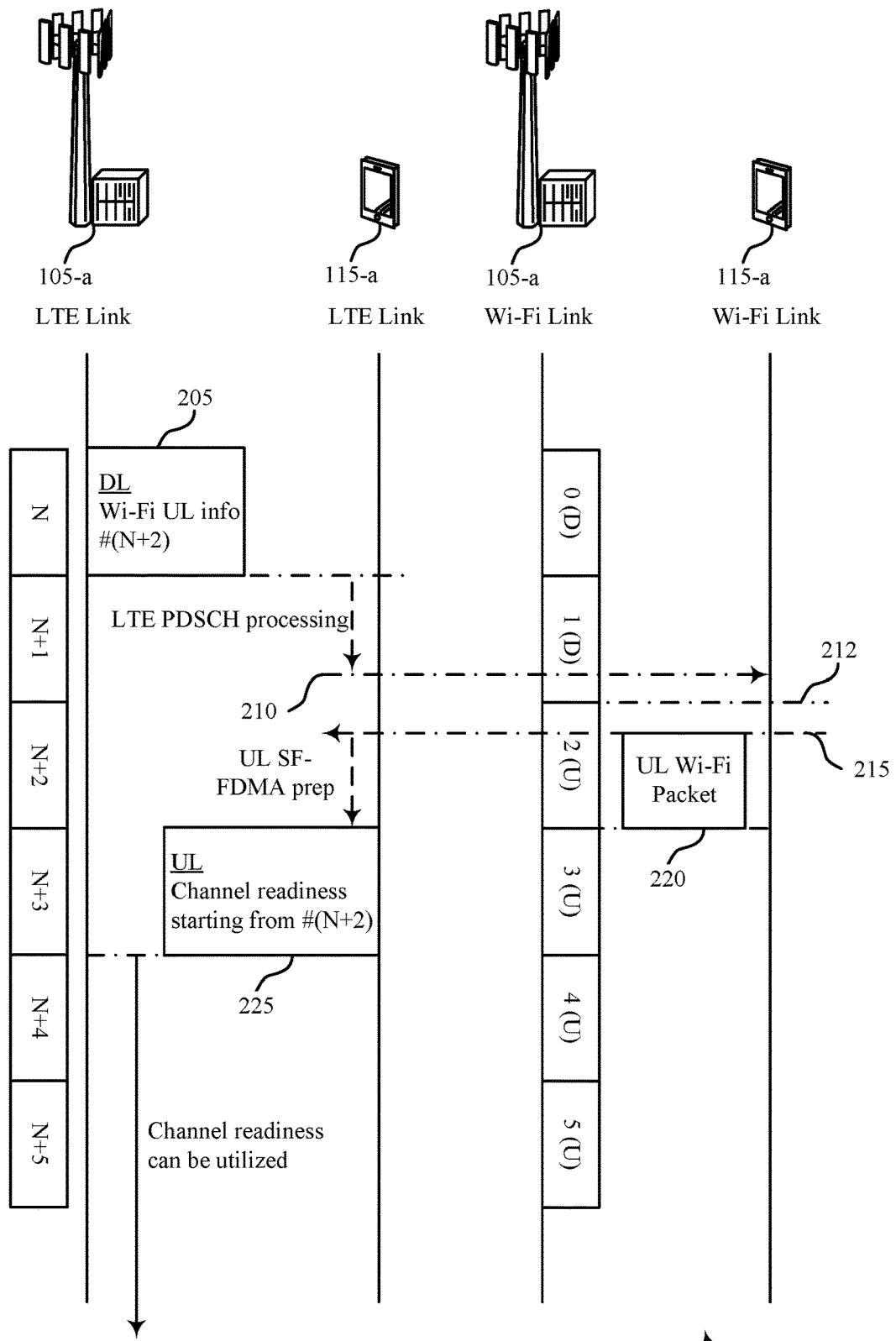
FIG. 2 illustrates an example of a wireless communications system for providing uplink scheduling and channel readiness feedback for a shared radio frequency spectrum band in accordance with various aspects of the present disclosure.
Figure 3:
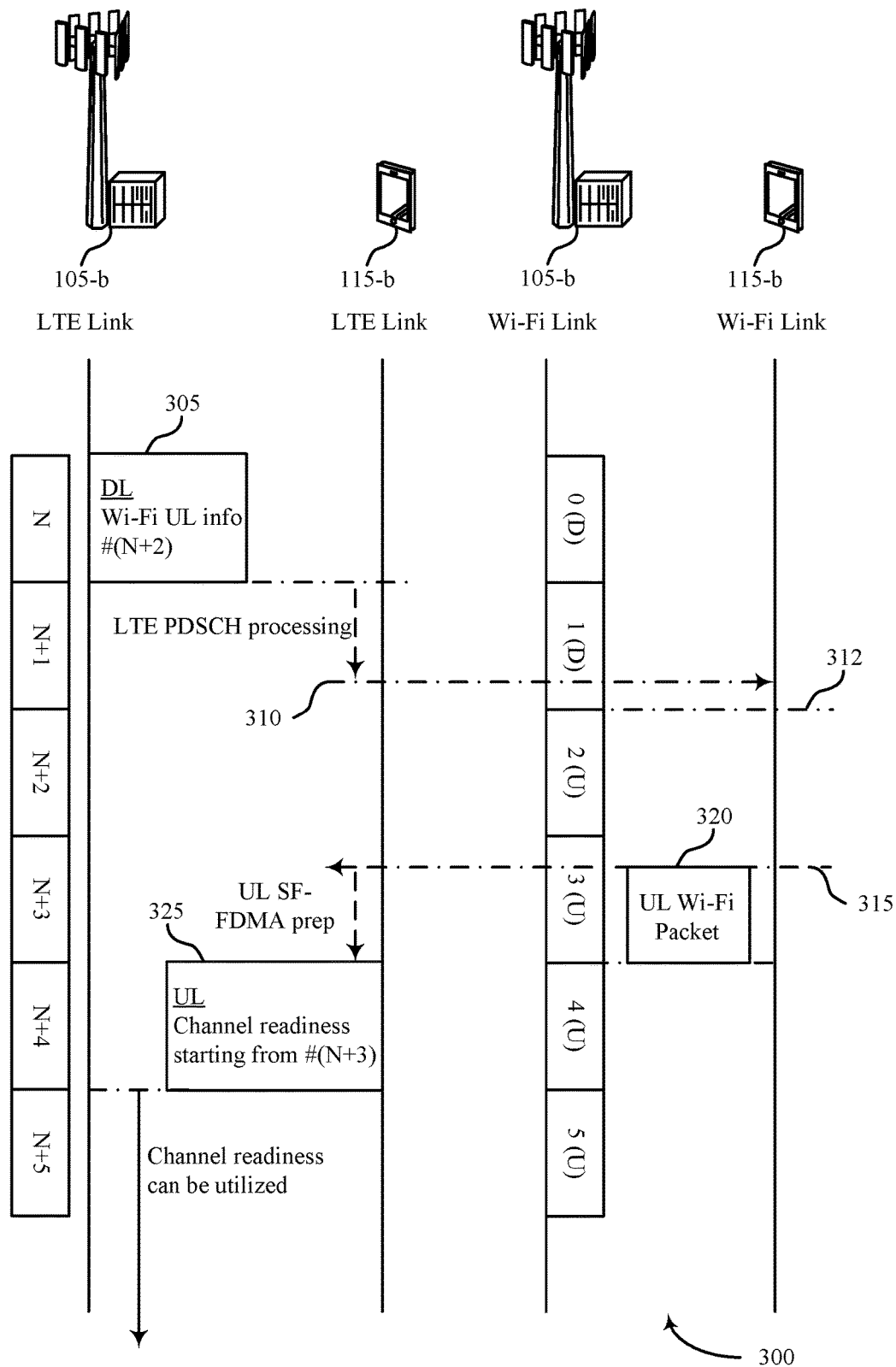
FIG. 3 illustrates an example of a wireless communications system for providing uplink scheduling and channel readiness feedback for a shared radio frequency spectrum band in accordance with various aspects of the present disclosure.
Figure 4:
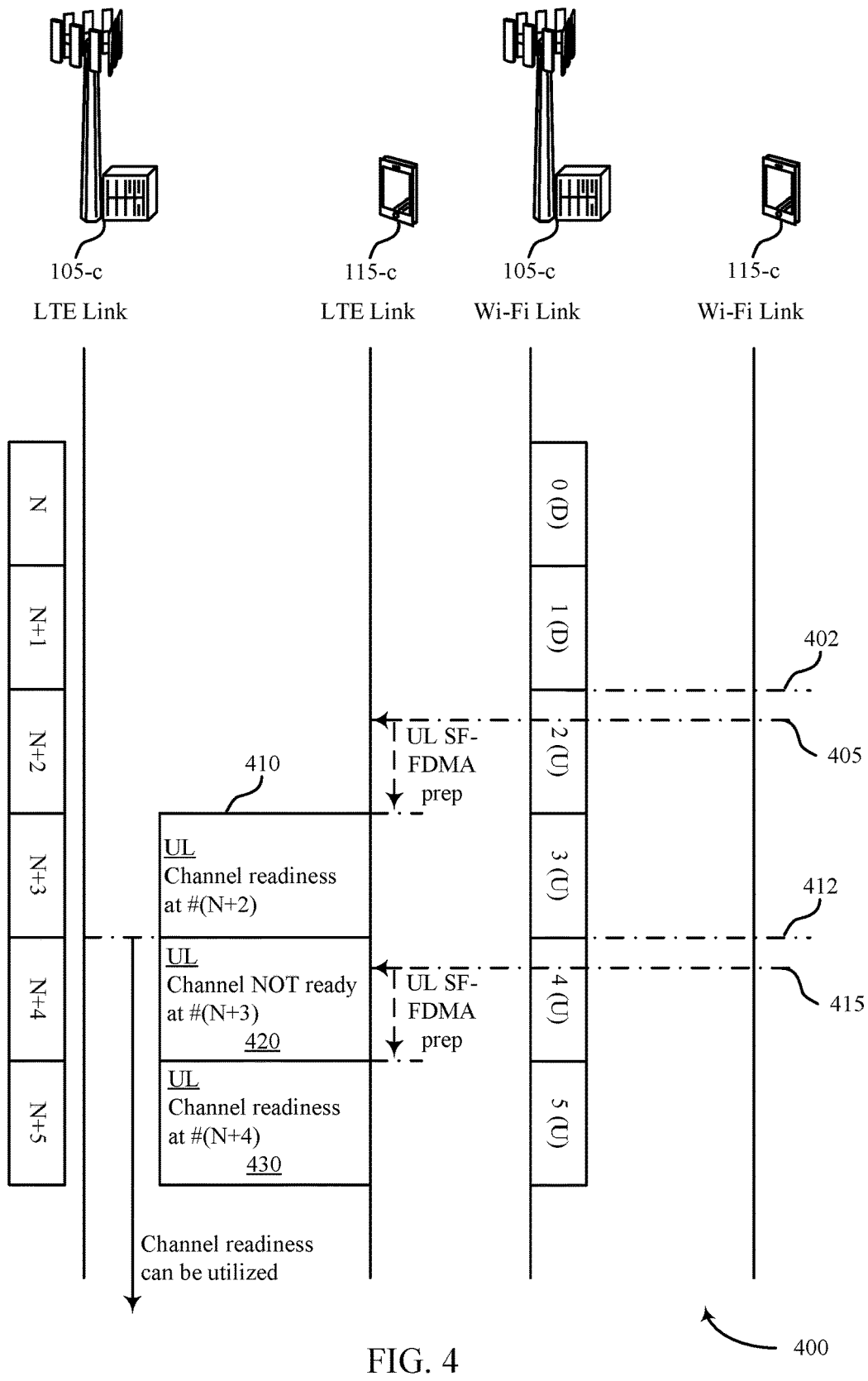
FIG. 4 illustrates an example of a wireless communications system for providing uplink scheduling and channel readiness feedback for a shared radio frequency spectrum band in accordance with various aspects of the present disclosure.

In an LTE-CW system, each UE 115 should report channel readiness information to its associated eNB 105 through the LTE link so that the eNB 105 can schedule future UL data transmissions. In accordance with some aspects, two different ways can be employed for fulfilling the channel readiness feedback process: passive channel readiness feedback examples and proactive channel readiness feedback examples. FIGS. 2 and 3 provide passive channel readiness feedback examples, and FIG. 4 provides a proactive feedback example.

FIG. 2 illustrates an example of wireless communications system 200 for providing UL scheduling and channel readiness feedback for a shared RF spectrum band. Wireless communications system 200 may be an example of portions of the wireless communications system 100 described with reference to FIG. 1. Wireless communications system 200 can include eNB 105-*a* and UE 115-*a*, which may be examples of the corresponding devices described with reference to FIG. 1.

Wireless communications system 200 can be a synchronized LTE/Wi-Fi network configured as an LTE-CB system. An LTE link can be used to coordinate data transmissions in the shared RF spectrum band of the Wi-Fi network. In some cases, the scheduling decision for an UL grant is made several milliseconds ahead of the time when the data transmission is to occur due at least in part to transmission and processing delays over the LTE link. Consequently, the wireless channel(s) of a Wi-Fi link may not be idle at the time the scheduled data transmission is supposed to occur.

In the passive channel readiness feedback example of FIG. 2, eNB 105-*a* may first determine UL data transmission scheduling to UE 115-*a*. In some implementations, an LTE-CW frame is 10 milliseconds having ten 1 millisecond subframes (e.g., the first five of ten subframes shown as subframes N, N+1, N+2, N+3, N+4, and N+5 on FIG. 2). Each subframe can be designated for either DL or UL channel usage. In the example of FIG. 2, a majority of the subframes in the LTE-CW frame are consecutively designated as UL channels. For example, subframes N and N+1 in the LTE link may corresponding to or synchronized with subframes 0 and 1 in the Wi-Fi link may be designated for DL channel usage, and subframes N+2, N+3, N+4, and N+5 in the LTE link corresponding to or synchronized with subframes 2, 3, 4, and 5 in the Wi-Fi link may be designated for UL channel usage.

The eNB 105-*a* may transmit a scheduling grant packet 205 to UE 115-*a* on the DL channel of the of the LTE link. The scheduling grant packet 205 may include UL channel information associated with the shared RF spectrum band of the Wi-Fi network. For example, the scheduling grant packet 205 may be transmitted during the subframe N of the LTE link and may include SIG and sub-band information of the scheduled wireless channel(s) of the Wi-Fi link. The scheduling grant packet 205 may include an indication to transmit during the N+2 subframe of the LTE link corresponding to subframe 2 of the Wi-Fi link. This scheduled UE 115-*a* (i.e., that which has been given an UL data transmission grant by eNB 105-*a*) processes (e.g., perform LTE physical downlink shared channel (PDSCH) processing) during a first portion of the N+1 subframe of the LTE link and decodes the scheduling grant packet 205 to obtain message 210 indication that the UE 115-*a* is authorized for an UL data transmission at subframe 2 of the Wi-Fi link. The UE 115-*a* performs a CCA procedure 212 at the beginning of subframe 2 of the Wi-Fi link to determine whether the scheduled wireless channel(s) of the Wi-Fi link are available. The UE 115-*a* may receive a response to the CCA procedure 212 indicating that the scheduled wireless channel(s) of the Wi-Fi link are indeed available and immediately ready for use. The UE 115-*a* may provide channel readiness feedback 215 that includes information obtain during the CCA procedure 212.

The UE 115-*a* may reserve the scheduled wireless channel(s) of the Wi-Fi link and transmit UL Wi-Fi data packet 220 on the scheduled wireless channel(s) of the Wi-Fi link for a remainder of the subframe 2 of the Wi-Fi link. In some cases, the UE 115-*a* may reserve all remaining UL channel subframes of the scheduled wireless channel(s) of the Wi-Fi link. The UE 115-*a* also may prepare for an UL transmission on the LTE link (e.g., for a UL SC-FDMA transmission) during subframe N+2 of the LTE link. The UE 115-*a* may transmit channel readiness information packet 225 to the eNB 105-*a* on an UL channel of the LTE link during subframe N+3. The channel readiness information packet 225 may include readiness information associated with the scheduled wireless channel(s) of the Wi-Fi link. In some cases, this channel readiness information may include a report of the CCA procedure 212 performed by the UE 115-*a* and may include an indication of channel readiness starting from subframe 2 of the Wi-Fi link through the remainder of the LTE-CW frame (e.g., subframes 3 through 9 of the Wi-Fi link).

After processing the channel readiness information, the eNb 105-*a* may utilize this channel readiness information from UE 115-*a* (and channel readiness information from other UEs 115 in some cases) to further schedule data transmissions for the UE 115-*a* or other UEs 115 during subsequent subframes of the LTE-CW frame (e.g., subframe N+4 of the LTE link). The eNb 105-*a* may also utilize this channel readiness information for scheduling data transmission is subsequent frames of the LTE-CW system.

FIG. 3 illustrates an example of wireless communications system 300 for providing UL scheduling and channel readiness feedback for a shared RF spectrum band. Wireless communications system 300 may be an example of portions of the wireless communications system 100 described with reference to FIG. 1. Wireless communications system 300 can include eNB 105-*b* and UE 115-*b*, which may be examples of the corresponding devices described with reference to FIG. 1.

Similar to the wireless communications system 200 of FIG. 2, wireless communications system 300 can be a synchronized LTE/Wi-Fi network configured as an LTE-CB system. In the passive readiness feedback example of FIG. 3, eNB 105-*b* may first determine UL data transmission scheduling to UE 115-*b*.

The eNB 105-*b* may transmit a scheduling grant packet 305 to UE 115-*b* on the DL channel of the of the LTE link. The scheduling grant packet 305 may include UL channel information associated with the shared RF spectrum band of the Wi-Fi network. For example, the scheduling grant packet 305 may be transmitted during the subframe N of the LTE link and may include SIG and sub-band information of the scheduled wireless channel(s) of the Wi-Fi link. The scheduling grant packet 305 may include an indication to transmit during the N+2 subframe of the LTE link corresponding to subframe 2 of the Wi-Fi link. This scheduled UE 115-*b* (i.e., that which has been given an UL data transmission grant by eNB 105-*b*) processes (e.g., perform LTE PDSCH processing) during a first portion of the N+1 subframe of the LTE link and decodes the scheduling grant packet 305 to obtain message 310 indication that the UE 115-*b* is authorized for an UL data transmission at subframe 2 of the Wi-Fi link. The UE 115-*b* performs a CCA procedure 312 at the beginning of subframe 2 of the Wi-Fi link to determine whether the scheduled wireless channel(s) of the Wi-Fi link are available. The UE 115-*b* may receive a response to the CCA procedure 312 to determine whether the scheduled wireless channel(s) of the Wi-Fi link are available.

However, the results of the CCA procedure 312 in the example of FIG. 3 indicate that the scheduled wireless channel(s) of the Wi-Fi link are not available until subframe N+3 of the LTE link corresponding to subframe 3 of the Wi-Fi link. The UE 115-*b* may continue CCA procedures and/or keep the results of the initial CCA. The UE 115-*b* waits for the scheduled wireless channel(s) of the Wi-Fi link to become available at the beginning of subframe 3 of the Wi-Fi link. The UE 115-*b* may provide channel readiness feedback 315 that includes information obtain during the CCA procedure 312.

The UE 115-*b* may reserve the scheduled wireless channel(s) of the Wi-Fi link and transmit UL Wi-Fi data packet 320 on the scheduled wireless channel(s) of the Wi-Fi link for a remainder of the subframe 3 of the Wi-Fi link. In some cases, the UE 115-*b* may reserve all remaining UL channel subframes of the scheduled wireless channel(s) of the Wi-Fi link. The UE 115-*b* also may prepare for an UL transmission on the LTE link (e.g., for a UL SC-FDMA transmission) during subframe N+3 of the LTE link. The UE 115-*b* may transmit channel readiness information packet 325 to the eNB 105-*b* on an UL channel of the LTE link during subframe N+3. The channel readiness information packet 325 may include readiness information associated with the scheduled wireless channel(s) of the Wi-Fi link. In some cases, this channel readiness information may include a report of the CCA procedure 312 performed by the UE 115-*b* and may include an indication of channel readiness starting from subframe 3 of the Wi-Fi link through the remainder of the LTE-CW frame (e.g., subframes 4 through 9 of the Wi-Fi link).

After processing the channel readiness information, the eNb 105-*b* may utilize this channel readiness information from UE 115-*b* (and channel readiness information from other UEs 115 in some cases) to further schedule data transmissions for the UE 115-*b* or other UEs 115 during subsequent subframes of the LTE-CW frame (e.g., subframe N+5 of the LTE link). The eNb 105-*b* may also utilize this channel readiness information for scheduling data transmission in subsequent frames of the LTE-CW system.

FIG. 4 illustrates an example of wireless communications system 400 for providing UL scheduling and channel readiness feedback for a shared RF spectrum band. Wireless communications system 400 may be an example of portions of the wireless communications system 100 described with reference to FIG. 1. Wireless communications system 400 can include eNB 105-*c* and UE 115-*c*, which may be examples of the corresponding devices described with reference to FIG. 1.

Wireless communications system 400 can also be a synchronized LTE/Wi-Fi network configured as an LTE-CB system. An LTE link can be used to coordinate data transmissions in the shared RF spectrum band of the Wi-Fi network. In the proactive channel readiness feedback example of FIG. 4, the UE 115-*c* may monitor a number of possible wireless channel(s) of a Wi-Fi link. The UE 115-*c* may monitor these wireless channel(s) of a Wi-Fi link at the beginning of each UL subframe, for example.

Similar to FIGS. 2 and 3, the LTE-CW frame is 10 milliseconds having ten 1 millisecond subframes (e.g., the first five of ten subframes shown as subframes N, N+1, N+2, N+3, N+4, and N+5 on FIG. 4) in some implementations. In the example of FIG. 4, a majority of the subframes in the LTE-CW frame are consecutively designated as UL channels. For example, subframes N and N+1 in the LTE link corresponding to or synchronized with subframes 0 and 1 in the Wi-Fi link may be designated for DL channel usage, and subframes N+2, N+3, N+4, and N+5 in the LTE link corresponding to or synchronized with subframes 2, 3, 4, and 5 in the Wi-Fi link may be designated for UL channel usage.

At the beginning of the subframe 2 of the Wi-Fi link (e.g., the first UL channel of the LTE-CW frame in the example of FIG. 4), an unscheduled UE 115-*c* performs a CCA procedure 402 to determine whether the number of wireless channel(s) of the Wi-Fi link are presently available. For example, the CCA procedure 402 may determine that some wireless channel(s) of the Wi-Fi link are available during subframe 2, but not during subframe 3. The UE 115-*c* may provide channel readiness feedback 405 that includes information obtain during the CCA procedure 402.

The UE 115-*c* may prepare for an UL transmission on the LTE link (e.g., for a UL SC-FDMA transmission) during subframe N+2 of the LTE link. The UE 115-*c* may transmit channel readiness information packet 410 to the eNB 105-*c* on an UL channel of the LTE link during subframe N+3. The channel readiness information packet 410 may include readiness information associated with the number of wireless channel(s) of the Wi-Fi link. In some cases, this channel readiness information may include a report of the CCA procedure 402 performed by the UE 115-*c* and may include an indication of channel readiness at subframe 2 of the Wi-Fi link. The UE 115-*c* may also transmit channel readiness information packet 420 to the eNB 105-*c* on an UL channel of the LTE link during subframe N+3. The channel readiness information packet 420 may include readiness information associated with the number of wireless channel(s) of the Wi-Fi link, for example, an indication that the wireless channel(s) and not ready or available at subframe 3 of the Wi-Fi link.

At the beginning of the subframe 4 of the Wi-Fi link, the UE 115-*c* performs another CCA procedure 412 to determine whether the number of wireless channel(s) of the Wi-Fi link are presently available. For example, the CCA procedure 412 may determine that some wireless channel(s) of the Wi-Fi link are available during subframe 4. The UE 115-*c* may provide channel readiness feedback 415 that includes information obtain during the CCA procedure 412.

The UE 115-*c* may again prepare for an UL transmission on the LTE link (e.g., for a UL SC-FDMA transmission) during subframe N+4 of the LTE link. The UE 115-*c* may transmit channel readiness information packet 430 to the eNB 105-*c* on an UL channel of the LTE link during subframe N+5. The channel readiness information packet 430 may include readiness information associated with the number of wireless channel(s) of the Wi-Fi link. In some cases, this channel readiness information may include a report of the CCA procedure 412 performed by the UE 115-*c* and may include an indication of channel readiness at subframe 4 of the Wi-Fi link.

In some examples, UE 115-*c* does not reserve any of the number of wireless channel(s) of the Wi-Fi link after performing the CCA procedures, but rather defers to the eNB 105-*c* to schedule data transmission. As such, after processing the channel readiness information in the channel readiness information packets 410, 420, and 430, the eNb 105-*c* may utilize this channel readiness information from UE 115-*c* (and channel readiness information from other UEs 115 in some cases) to schedule data transmissions for UE 115-*c* or other UEs 115. The eNb 105-*c* can utilize this channel readiness information for scheduling data transmission in the current frame (e.g., after subframe N+3 of the LTE link) or subsequent frames of the LTE-CW system.

In this regard, as opposed to an eNB 105 attempting to perform a channel assessment procedure and decode the packets that can result in long delays due at least in part to possible decoding failures, the UEs 115 may perform the channel assessment procedures and report the channel readiness information to the eNBs 105 for use in future UL scheduling decisions associated with data transmissions on the shared RF spectrum band of the Wi-Fi network.

Moreover, an eNB 105 may employ different ways to utilize the channel readiness feedback from both the passive and proactive channel readiness feedback examples for determining UL scheduling for UEs 115 in the LTE-CW system. For example, an eNB 105 may utilize only the most recent channel readiness feedback information for determining UL scheduling decisions associated with the wireless channel(s) of the of the shared RF spectrum band. Alternatively or additionally, the eNB 105 may combine the most recent channel readiness feedback information with historical channel readiness feedback information and employ statistical analysis to provide an indication or predication of the wireless channel(s) when determining UL scheduling decisions.

Figure 5:
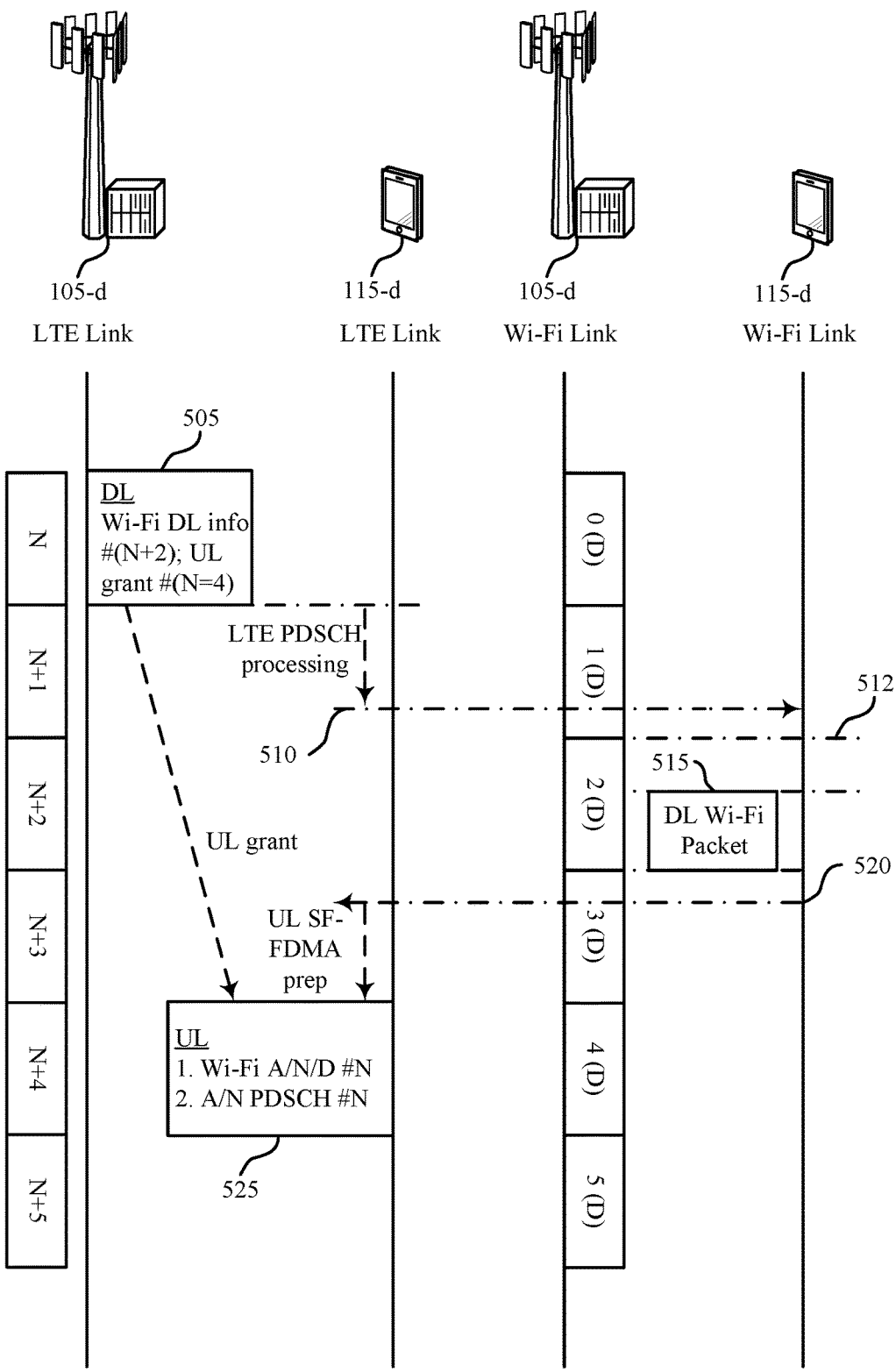
FIG. 5 illustrates an example of a wireless communications system for providing downlink scheduling and channel readiness feedback for a shared radio frequency spectrum band in accordance with various aspects of the present disclosure.

FIG. 5 illustrates an example of wireless communications system 500 for providing DL scheduling and channel readiness feedback for a shared RF spectrum band. Wireless communications system 500 may be an example of portions of the wireless communications system 100 described with reference to FIG. 1. Wireless communications system 500 can include eNB 105-d and UE 115-d, which may be examples of the corresponding devices described with reference to FIG. 1

Wireless communications system 500 can be a synchronized LTE/Wi-Fi network configured as an LTE-CB system as described herein with respect to scheduling UL data transmission. An LTE link can be used to coordinate data transmissions in the shared RF spectrum band of the Wi-Fi network. In some cases, the scheduling decision for a DL grant is made several milliseconds ahead of the time when the data transmission is to occur due at least in part to transmission and processing delays over the LTE link. Consequently, the wireless channel(s) of a Wi-Fi link may not be idle at the time the scheduled data transmission is supposed to occur, and as such a DL data transmission grant may be provided by the eNB 105-d regardless of the readiness of the Wi-Fi channel.

The eNB 105-d may determine DL data transmission scheduling to UE 115-d. In some implementations, an LTE-CW frame is 10 milliseconds having ten 1 millisecond subframes (e.g., the first five of ten subframes shown as subframes N, N+1, N+2, N+3, N+4, and N+5 on FIG. 2). Each subframe can be designated for either DL or UL channel usage. In the example of FIG. 5, a majority of the subframes in the LTE-CW frame are consecutively designated as DL channels. For example, subframes N, N+1, N+2, N+3, N+4, and N+5 in the LTE link may correspond to or be synchronized with subframes 0, 1, 2, 3, 4, and 5 in the Wi-Fi link. In the example of FIG. 5, subframes N, N+1, N+2, N+3, and N+5 of the LTE link may be designates for DL channel usage and subframe N+4 of the LTE link may be designates for DL channel usage, whereas subframes 0, 1, 2, 3, 4, and 5 in the Wi-Fi link may be all designated for DL channel usage.

The eNB 105-d may transmit a scheduling grant packet 505 to UE 115-d on the DL channel of the of the LTE link. The scheduling grant packet 505 may include DL channel information associated with the shared RF spectrum band of the Wi-Fi network. For example, the scheduling grant packet 505 may be transmitted during the subframe N of the LTE link and may include SIG and sub-band information of the scheduled wireless channel(s) of the Wi-Fi link. In some implementations, the scheduling grant packet 505 may also include MCS information for receiving the DL data transmission. The scheduling grant packet 505 may include an indication to DL data transmission will occur during the N+2 subframe of the LTE link corresponding to subframe 2 of the Wi-Fi link. The scheduling grant packet 505 may also include an UL grant for subframe N+4 of the LTE link so that the UE 115-d can communicate back to the eNB 115-d regarding verification of the reception of the scheduled DL WiFi data packet 515 and the information contained in the scheduling grant packet 505 packet.

However, in the example of FIG. 5, the scheduled wireless channel(s) of the of the Wi-Fi link are not available at the beginning of subframe 2 of the Wi-Fi link. The UE 115-d processes (e.g., perform LTE PDSCH processing) the scheduling grant packet 505 during a first portion of the N+1 subframe of the LTE link and decodes a message 510 that the DL data transmission is to begin at subframe 2 of the Wi-Fi link. The eNB 105-d may perform a CCA procedure 512 at the beginning of subframe 2 of the Wi-Fi link to determine whether the scheduled wireless channel(s) of the Wi-Fi link are available. The eNB 105-d may receive a response to the CCA procedure 512 indicating that the scheduled wireless channel(s) of the Wi-Fi link are not ready or available. The eNB 105-d may wait until the scheduled wireless channel(s) of the Wi-Fi link are idle and ready and begin transmitting the DL Wi-Fi data packet 515 in the middle of subframe 2 the Wi-Fi link after the CCA procedure 512. The UE 115-d, expecting a DL data transmission during subframe 2 of the Wi-Fi link, may monitor the scheduled wireless channel(s) for transmission of the DL Wi-Fi data packet 515.

After decoding the DL Wi-Fi data packet 515, the UE 115-d will send back message 510 that includes acknowledgement information including the appropriate ACK/NACK/DTX messages associated with decoding the DL Wi-Fi data packet 515. The UE 115-d also may prepare for an UL transmission on the LTE link (e.g., for a UL SC-FDMA transmission) during subframe N+3 of the LTE link. The UE 115-d may transmit DL acknowledgement information packet 525 to the eNB 105-d on an UL channel of the LTE link during subframe N+4. The DL acknowledgement information packet 525 may include the acknowledgement information including the appropriate ACK/NACK/DTX messages associated with decoding the DL Wi-Fi data packet 515 on the scheduled wireless channel(s) of the Wi-Fi link. The DL acknowledgement information packet 525 may also include the appropriate ACK/NACK messages associated with decoding the scheduling grant packet 505 on the LTE link.

In the example of FIG. 5 where that scheduled wireless channel(s) of the Wi-Fi link are initially not ready or available and the eNB 105-d may be scheduling data for multiple UEs 115 (e.g., UE 115-d and other UEs 115 not shown), the eNB 105-d may adjust the scheduling for DL data transmission to the multiple UEs. For example, the eNB 105-a may strictly adhere to the original scheduling decision and discards any leading portions of the DL data transmission where the channel was not ready. Alternatively or additionally, the eNB 105-a may shift the original scheduling decision and truncate the trailing portions of the DL data transmission at the scheduled time for stopping the DL data transmission.

For example, if eNB 105-d may be scheduled to transmit to three UEs 115 for 2 ms each in the order of UE 115-d, a second UE 115, and a third UE 115. If the scheduled wireless channel(s) of the Wi-Fi link do not become ready until 1 ms after the scheduled time when the eNB 105-d is supposed to transmit to UE 115-d, the eNB 105-d may adhere to the original scheduling decision and transmit to the UE 115-d for 1 ms, the second UE 115 for 2 ms, and the third UE 115 for 2 ms. Alternatively, eNB 105-*d* may shift the original scheduling decision and transmit to UE 115-*d* for 2 ms, the second UE 115 for 2 ms, and the third UE 115 for 1 ms.

Figure 6:
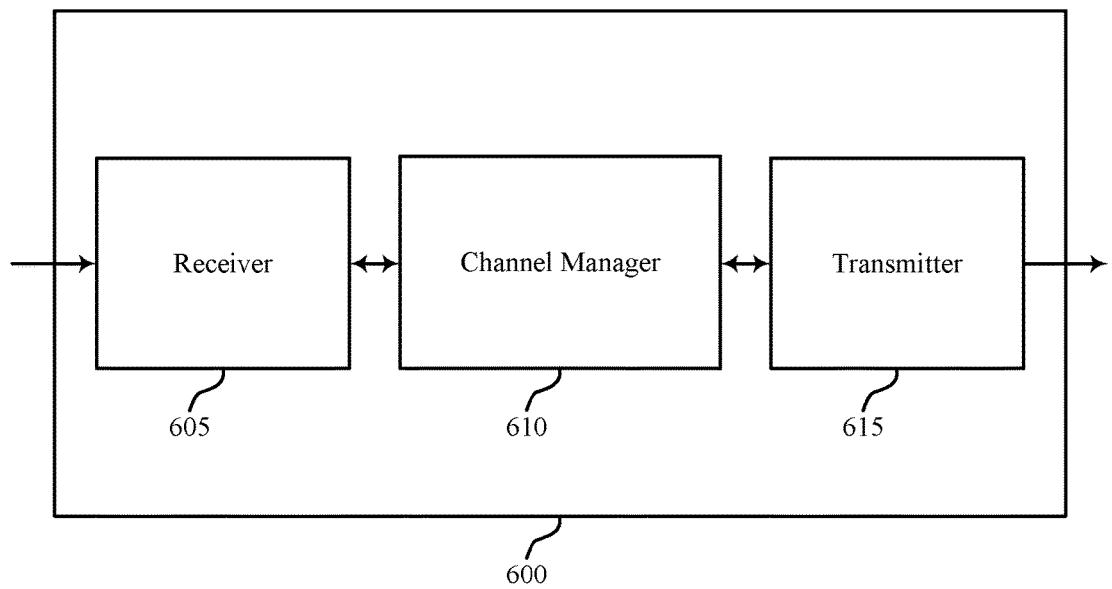
FIGS. 6 through 8 are block diagrams illustrating examples of wireless devices that supports techniques for downlink scheduling and uplink scheduling in a shared radio frequency spectrum band in accordance with aspects of the present disclosure.

FIG. 6 shows a block diagram of a wireless device 600 that supports techniques for DL scheduling and UL scheduling in a shared RF spectrum band in accordance with various aspects of the present disclosure. Wireless device 600 may be an example of aspects of a UE 115 described with reference to FIGS. 1 through 5. Wireless device 600 may include receiver 605, channel manager 610 and transmitter 615. Wireless device 600 may also include a processor. Each of these components may be in communication with each other.

The receiver 605 may receive information such as packets, user data, or control information associated with various information channels (e.g., control channels, data channels, and information related to techniques for DL scheduling and UL scheduling in a shared RF spectrum band, etc.). Information may be passed on to other components of the device. The receiver 605 may be an example of aspects of the transceiver 925 described with reference to FIG. 9.

The channel manager 610 may receive an UL data transmission grant associated with a channel of shared RF spectrum band, perform a channel readiness procedure associated with the channel, and transmit channel readiness information based at least in part on the channel readiness procedure to a base station, the channel readiness information being transmitted via an UL channel of a licensed RF spectrum band different from the shared RF band. The channel manager 610 may also be an example of aspects of the channel manager 905 described with reference to FIG. 9.

The transmitter 615 may transmit signals received from other components of wireless device 600. In some examples, the transmitter 615 may be collocated with a receiver in a transceiver module. For example, the transmitter 615 may be an example of aspects of the transceiver 925 described with reference to FIG. 9. The transmitter 615 may include a single antenna, or it may include a plurality of antennas.

Figure 7:
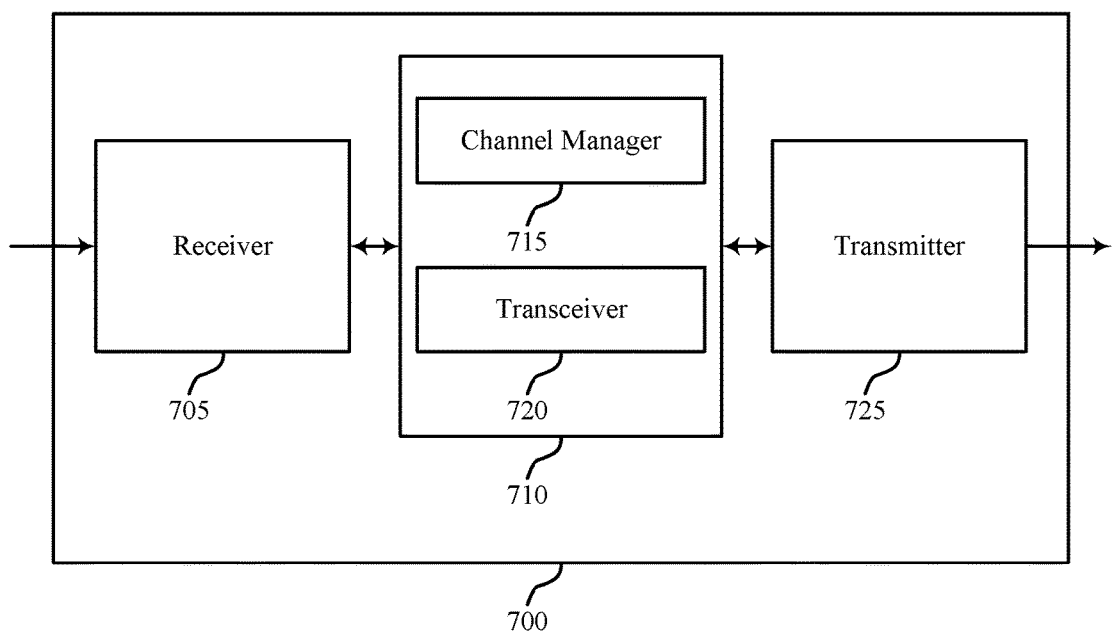

FIG. 7 shows a block diagram of a wireless device 700 that supports techniques for DL scheduling and UL scheduling in a shared RF spectrum band in accordance with various aspects of the present disclosure. Wireless device 700 may be an example of aspects of a wireless device 600 or a UE 115 described with reference to FIGS. 1 through 5. Wireless device 700 may include receiver 705, channel manager 710 and transmitter 725. Wireless device 700 may also include a processor. Each of these components may be in communication with each other.

The receiver 705 may receive information which may be passed on to other components of the device. The receiver 705 may also perform the functions described with reference to the receiver 605 of FIG. 6. The receiver 705 may be an example of aspects of the transceiver 925 described with reference to FIG. 9.

The channel manager 710 may be an example of aspects of channel manager 610 described with reference to FIG. 6. The channel manager 710 may include channel manager 715 and transceiver 720. The channel manager 710 may be an example of aspects of the channel manager 905 described with reference to FIG. 9.

The channel manager 715 may delay transmission of data via the channel based at least in part on the determination that the channel is unavailable, monitor the channel of the shared RF spectrum band to obtain subsequent channel readiness information, and perform channel readiness procedure associated with the channel.

The transceiver 720 may transmit data via the channel concurrently with the transmission of the channel readiness information to the base station, transmit data via the channel after the transmission of the channel readiness information to the base station, transmit the subsequent channel readiness information to the base station, the subsequent channel readiness information being transmitted via the UL channel of the licensed RF spectrum band, reserve the channel of the shared RF spectrum band, receive an UL data transmission grant associated with a channel of shared RF spectrum band, transmit channel readiness information based at least in part on the channel readiness procedure to a base station, the channel readiness information being transmitted via an UL channel of a licensed RF spectrum band different from the shared RF band, and transmit data via the channel based at least in part on the determination that the channel is available. In some cases, the UL data transmission grant is received prior to performing the channel readiness procedure. In some cases, the UL data transmission grant is received after the transmission of the channel readiness information to the base station. In some cases, the licensed RF spectrum band is an LTE RF spectrum band.

The transmitter 725 may transmit signals received from other components of wireless device 700. In some examples, the transmitter 725 may be collocated with a receiver in a transceiver module. For example, the transmitter 725 may be an example of aspects of the transceiver 925 described with reference to FIG. 9. The transmitter 725 may utilize a single antenna, or it may utilize a plurality of antennas.

Figure 8:
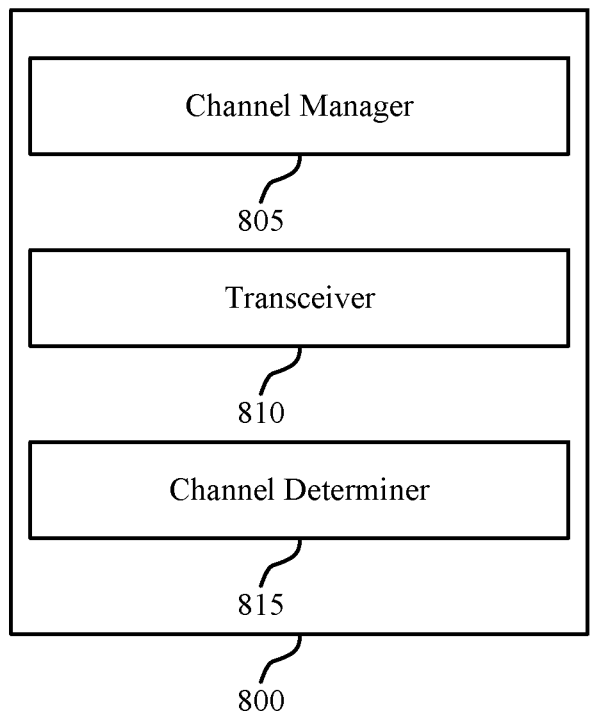

FIG. 8 shows a block diagram of a channel manager 800 which may be an example of the corresponding component of wireless device 600 or wireless device 700. That is, channel manager 800 may be an example of aspects of channel manager 610 or channel manager 710 described with reference to FIGS. 6 and 7. The channel manager 800 may also be an example of aspects of the channel manager 905 described with reference to FIG. 9.

The channel manager 800 may include channel manager 805, transceiver 810 and channel determiner 815. Each of these modules may communicate, directly or indirectly, with one another (e.g., via one or more buses).

The channel manager 805 may delay transmission of data via the channel based at least in part on the determination that the channel is unavailable, monitor the channel of the shared RF spectrum band to obtain subsequent channel readiness information, and perform a channel readiness procedure associated with the channel.

The transceiver 810 may transmit data via the channel concurrently with the transmission of the channel readiness information to the base station, transmit data via the channel after the transmission of the channel readiness information to the base station, transmit the subsequent channel readiness information to the base station, the subsequent channel readiness information being transmitted via the UL channel of the licensed RF spectrum band, reserve the channel of the shared RF spectrum band, receive an UL data transmission grant associated with a channel of shared RF spectrum band, transmit channel readiness information based at least in part on the channel readiness procedure to a base station, the channel readiness information being transmitted via an UL channel of a licensed RF spectrum band different from the shared RF band, and transmit data via the channel based at least in part on the determination that the channel is available. In some cases, the UL data transmission grant is received prior to performing the channel readiness procedure. In some cases, the UL data transmission grant is received after the transmission of the channel readiness information to the base station. In some cases, the licensed RF spectrum band is an LTE RF spectrum band.

The channel determiner 815 may determine that the channel is unavailable based at least in part on the channel readiness procedure, and determine that the channel is available based at least in part on the channel readiness procedure.

Figure 9:
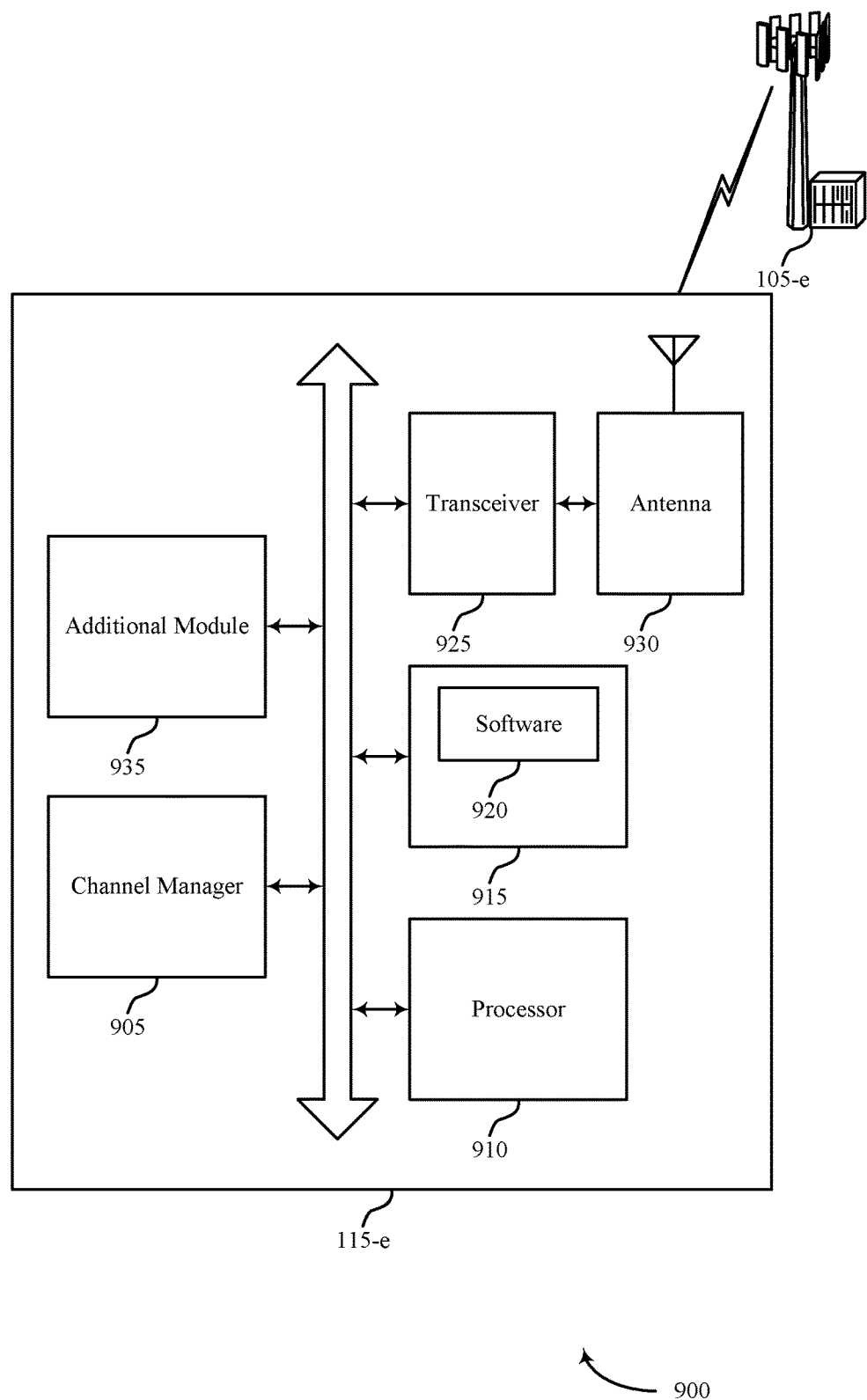
FIG. 9 is a block diagram illustrating an example of a system including a UE that supports techniques for downlink scheduling and uplink scheduling in a shared radio frequency spectrum band in accordance with aspects of the present disclosure.

FIG. 9 shows a diagram of a system 900 including a device that supports techniques for DL scheduling and UL scheduling in a shared RF spectrum band in accordance with various aspects of the present disclosure. For example, system 900 may include UE 115-e, which may be an example of a wireless device 600, a wireless device 700, or a UE 115 as described with reference to FIGS. 1 through 8.

UE 115-e may also include channel manager 905, processor 910, memory 915, transceiver 925, antenna 930 and additional module 935. Each of these modules may communicate, directly or indirectly, with one another (e.g., via one or more buses).

The channel manager 905 may be an example of a channel manager as described with reference to FIGS. 6 through 8. The processor 910 may include an intelligent hardware device, (e.g., a central processing unit (CPU), a microcontroller, an application specific integrated circuit (ASIC), etc.). The memory 915 may include random access memory (RAM) and read only memory (ROM). The memory 915 may store computer-readable, computer-executable software including instructions that, when executed, cause the processor to perform various functions described herein (e.g., techniques for DL scheduling and UL scheduling in a shared RF spectrum band, etc.). In some cases, the software 920 may not be directly executable by the processor but may cause a computer (e.g., when compiled and executed) to perform functions described herein.

The transceiver 925 may communicate bi-directionally, via one or more antennas, wired, or wireless links, with one or more networks, as described above. For example, the transceiver 925 may communicate bi-directionally with a base station 105-e or another UE 115. The transceiver 925 may also include a modem to modulate the packets and provide the modulated packets to the antennas for transmission, and to demodulate packets received from the antennas. In some cases, the wireless device may include a single antenna 930. However, in some cases the device may have more than one antenna, which may be capable of concurrently transmitting or receiving multiple wireless transmissions.

The additional module 935 may enable operations using enhanced component carriers (ECCs) such as communication using shared or unlicensed spectrum, using reduced TTIs or subframe durations, or using a large number of component carriers.

Figure 10:
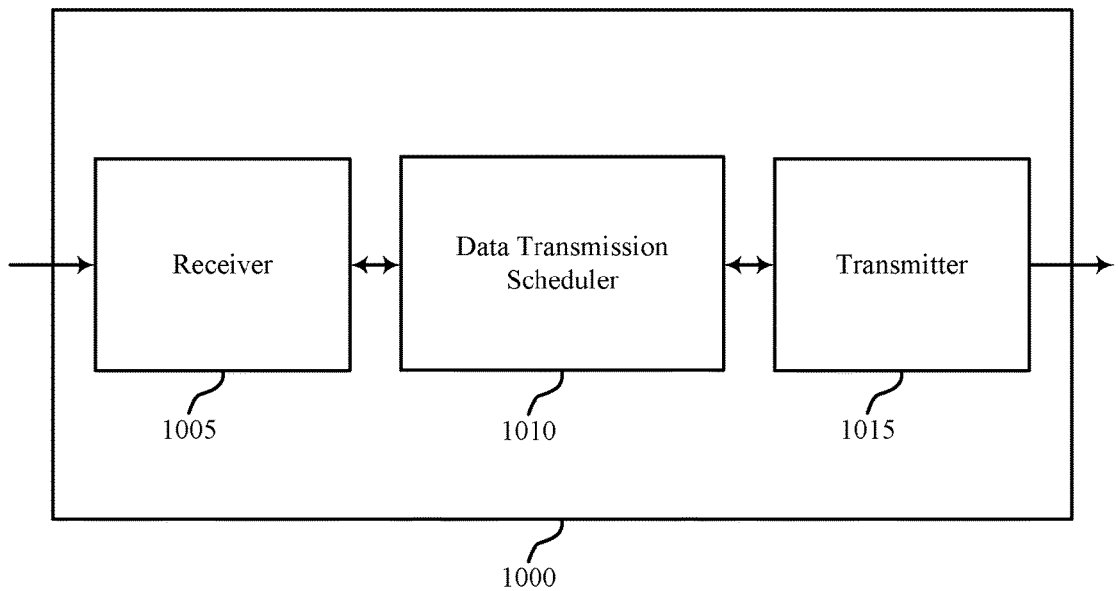
FIGS. 10 through 12 are block diagrams illustrating examples of wireless devices that supports techniques for downlink scheduling and uplink scheduling in a shared radio frequency spectrum band in accordance with aspects of the present disclosure.

FIG. 10 shows a block diagram of a wireless device 1000 that supports techniques for DL scheduling and UL scheduling in a shared RF spectrum band in accordance with various aspects of the present disclosure. Wireless device 1000 may be an example of aspects of a base station 105 described with reference to FIGS. 1 through 5. Wireless device 1000 may include receiver 1005, data transmission scheduler 1010 and transmitter 1015. Wireless device 1000 may also include a processor. Each of these components may be in communication with each other.

The receiver 1005 may receive information such as packets, user data, or control information associated with various information channels (e.g., control channels, data channels, and information related to techniques for DL scheduling and UL scheduling in a shared RF spectrum band, etc.). Information may be passed on to other components of the device. The receiver 1005 may be an example of aspects of the transceiver 1325 described with reference to FIG. 13.

The data transmission scheduler 1010 may schedule a data transmission on one or more channels of a shared RF spectrum band, and transmit a data transmission grant for the scheduled data transmission to a wireless communication device, the data transmission grant being transmitted via a DL channel of a licensed RF spectrum band different from the shared RF band. The data transmission scheduler 1010 may also be an example of aspects of the data transmission scheduler 1305 described with reference to FIG. 13.

The transmitter 1015 may transmit signals received from other components of wireless device 1000. In some examples, the transmitter 1015 may be collocated with a receiver in a transceiver module. For example, the transmitter 1015 may be an example of aspects of the transceiver 1325 described with reference to FIG. 13. The transmitter 1015 may include a single antenna, or it may include a plurality of antennas.

Figure 11:
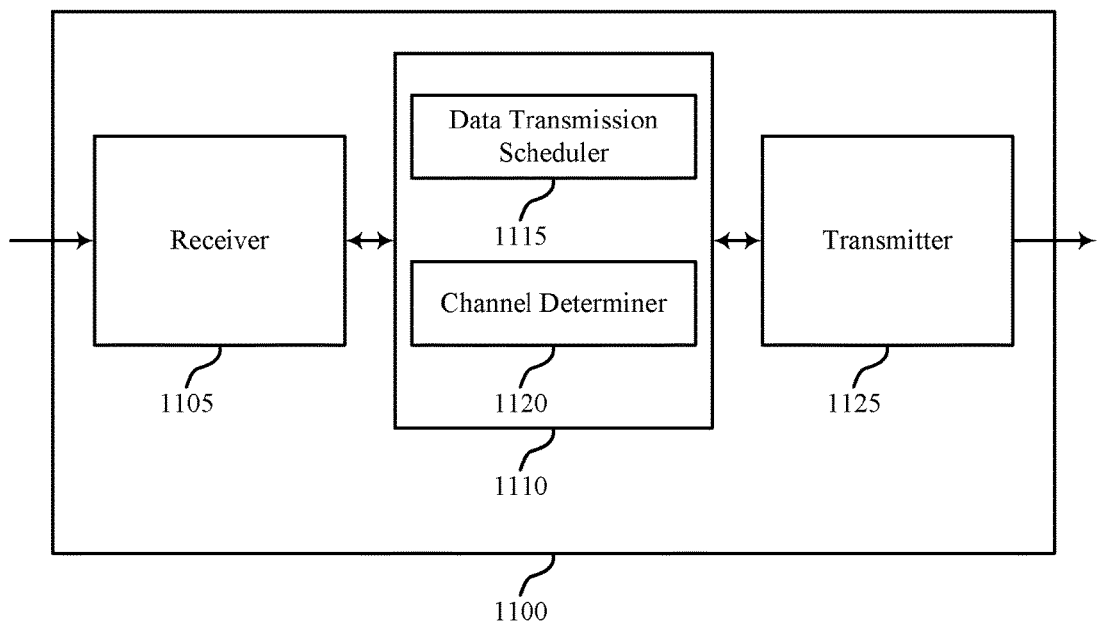

FIG. 11 shows a block diagram of a wireless device 1100 that supports techniques for DL scheduling and UL scheduling in a shared RF spectrum band in accordance with various aspects of the present disclosure. Wireless device 1100 may be an example of aspects of a wireless device 1000 or a base station 105 described with reference to FIGS. 1 through 10. Wireless device 1100 may include receiver 1105, data transmission scheduler 1110 and transmitter 1125. Wireless device 1100 may also include a processor. Each of these components may be in communication with each other.

The receiver 1105 may receive information which may be passed on to other components of the device. The receiver 1105 may also perform the functions described with reference to the receiver 1005 of FIG. 10. The receiver 1105 may be an example of aspects of the transceiver 1325 described with reference to FIG. 13.

The data transmission scheduler 1110 may be an example of aspects of data transmission scheduler 1010 described with reference to FIG. 10. The data transmission scheduler 1110 may include data transmission scheduler 1115 and channel determiner 1120. The data transmission scheduler 1110 may be an example of aspects of the data transmission scheduler 1305 described with reference to FIG. 13.

The data transmission scheduler 1115 may schedule a data transmission on one or more channels of a shared RF spectrum band, and delay the transmission of the data transmission grant. In some cases, the data transmission grant is associated with an UL data transmission of the wireless communication device, and the data transmission scheduler 1115 may further comprise determining the data transmission grant based at least in part on the received channel readiness information.

The channel determiner 1120 may transmit a data transmission grant for the scheduled data transmission to a wireless communication device, the data transmission grant being transmitted via a DL channel of a licensed RF spectrum band different from the shared RF band, and receive channel readiness information associated with the one or more channels from the wireless communication device, the channel readiness information being received via an UL channel of the licensed RF spectrum band. In some cases, the data transmission grant is associated with a DL data transmission to the wireless communication device, and the data transmission scheduler 1115 may further comprise determining that the one or more channels are unavailable based at least in part on the received channel readiness information. In some cases, the licensed RF spectrum band is long term evolution (LTE) RF spectrum band.

The transmitter 1125 may transmit signals received from other components of wireless device 1100. In some examples, the transmitter 1125 may be collocated with a receiver in a transceiver module. For example, the transmitter 1125 may be an example of aspects of the transceiver 1325 described with reference to FIG. 13. The transmitter 1125 may utilize a single antenna, or it may utilize a plurality of antennas.

Figure 12:
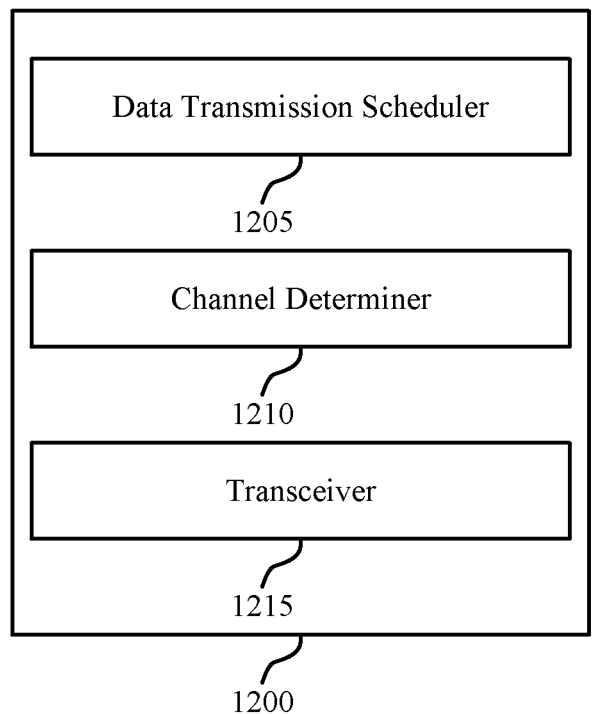

FIG. 12 shows a block diagram of a data transmission scheduler 1200 which may be an example of the corresponding component of wireless device 1000 or wireless device 1100. That is, data transmission scheduler 1200 may be an example of aspects of data transmission scheduler 1010 or data transmission scheduler 1110 described with reference to FIGS. 10 and 11. The data transmission scheduler 1200 may also be an example of aspects of the data transmission scheduler 1305 described with reference to FIG. 13.

The data transmission scheduler 1200 may include data transmission scheduler 1205, channel determiner 1210 and transceiver 1215. Each of these modules may communicate, directly or indirectly, with one another (e.g., via one or more buses). The data transmission scheduler 1205 may schedule a data transmission on one or more channels of a shared RF spectrum band, and delay the transmission of the data transmission grant. In some cases, the data transmission grant is associated with an UL data transmission of the wireless communication device, and the data transmission scheduler 1200 may further determine the data transmission grant based at least in part on the received channel readiness information.

The channel determiner 1210 may transmit a data transmission grant for the scheduled data transmission to a wireless communication device, the data transmission grant being transmitted via a DL channel of a licensed RF spectrum band different from the shared RF band, and receive channel readiness information associated with the one or more channels from the wireless communication device, the channel readiness information being received via an UL channel of the licensed RF spectrum band. In some cases, the data transmission grant is associated with a DL data transmission to the wireless communication device, and the data transmission scheduler 1205 further comprises determining that the one or more channels are unavailable based at least in part on the received channel readiness information. In some cases, the licensed RF spectrum band is long term evolution (LTE) RF spectrum band.

The transceiver 1215 may transmit the data transmission grant associated with the one or more channels regardless of a readiness of the one or more channels at a time the data transmission is scheduled, and transmit information associated with the data transmission grant to the wireless communication device, the information being transmitted via the DL channel of the licensed frequency spectrum band. In some cases, the information comprises a modulation and coding scheme, sub-band assignments, or a combination thereof.

Figure 13:
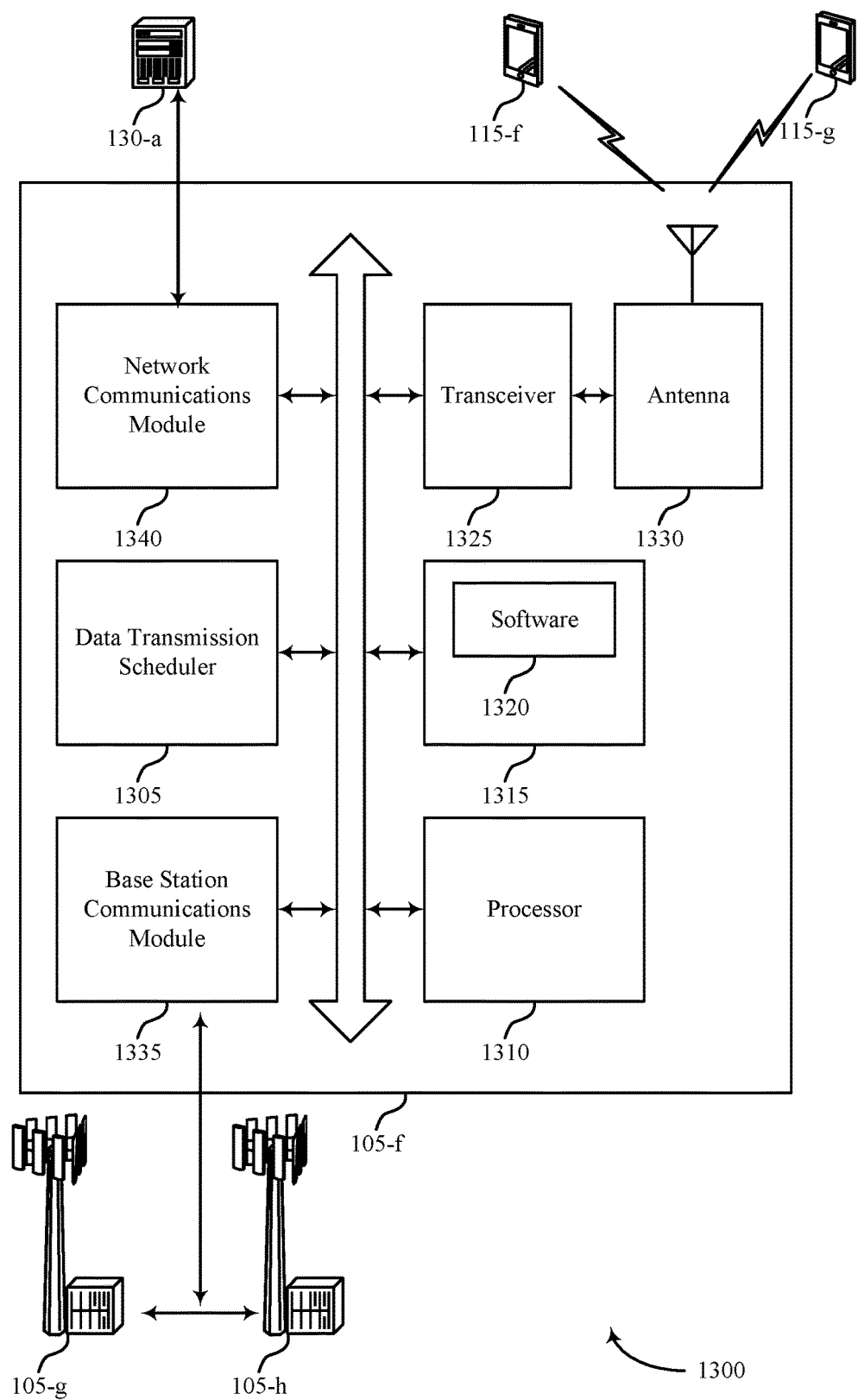
FIG. 13 is a block diagram illustrating an example of a system including a base station that supports techniques for downlink scheduling and uplink scheduling in a shared radio frequency spectrum band in accordance with aspects of the present disclosure.

FIG. 13 shows a diagram of a wireless system 1300 including a device configured that supports techniques for DL scheduling and UL scheduling in a shared RF spectrum band in accordance with various aspects of the present disclosure. For example, system 1300 may include base station 105-*f*, which may be an example of a wireless device 1000, a wireless device 1100, or a base station 105 as described with reference to FIGS. 1-5 and 10-12. Base station 105-*f* may also include components for bi-directional voice and data communications including components for transmitting communications and components for receiving communications. For example, base station 105-*f* may communicate bi-directionally with one or more UEs (e.g., UE 115-*f* and UE 115-*g*). Base station 105-*f* may also include data transmission scheduler 1305, processor 1310, memory 1315, transceiver 1325, antenna 1330, base station communications module 1335 and network communications module 1340. Each of these modules may communicate, directly or indirectly, with one another (e.g., via one or more buses).

The data transmission scheduler 1305 may be an example of a data transmission scheduler as described with reference to FIGS. 10 through 12. The processor 1310 may include an intelligent hardware device, (e.g., a CPU, a microcontroller, an ASIC, etc.). The memory 1315 may include RAM and ROM. The memory 1315 may store computer-readable, computer-executable software including instructions that, when executed, cause the processor to perform various functions described herein (e.g., techniques for DL scheduling and UL scheduling in a shared RF spectrum band, etc.). In some cases, the software 1320 may not be directly executable by the processor but may cause a computer (e.g., when compiled and executed) to perform functions described herein.

The transceiver 1325 may communicate bi-directionally, via one or more antennas, wired, or wireless links, with one or more networks, as described above. For example, the transceiver 1325 may communicate bi-directionally with a base station 105 or a UE 115. The transceiver 1325 may also include a modem to modulate the packets and provide the modulated packets to the antennas for transmission, and to demodulate packets received from the antennas. In some cases, the wireless device may include a single antenna 1330. However, in some cases the device may have more than one antenna 1330, which may be capable of concurrently transmitting or receiving multiple wireless transmissions.

The base station communications module 1335 may manage communications with other base station 105, and may include a controller or scheduler for controlling communications with UEs 115 in cooperation with other base stations 105 (e.g., base station 105-*g* and base station 105-*h*). For example, the base station communications module 1335 may coordinate scheduling for transmissions to UEs 115 for various interference mitigation techniques such as beamforming or joint transmission. In some examples, base station communications module 1335 may provide an X2 interface within an LTE/LTE-A wireless communication network technology to provide communication between base stations 105 (e.g., base station 105-*g* and base station 105-*h*).

The network communications module 1340 may manage communications with the core network 130-*a* (e.g., via one or more wired backhaul links). For example, the network communications module 1340 may manage the transfer of data communications for client devices, such as one or more UEs 115.

Figure 14:
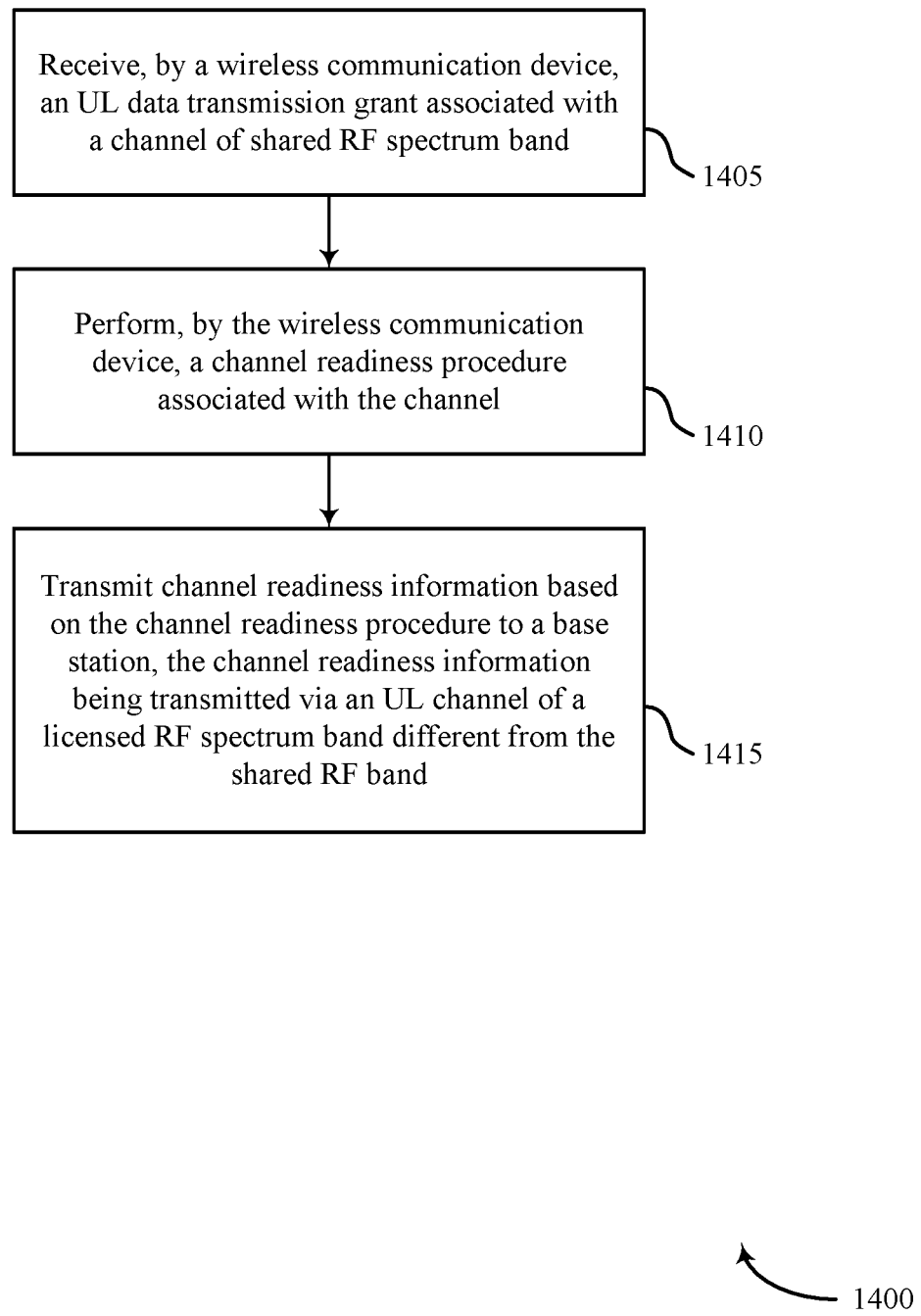
FIGS. 14 through 21 are flow charts illustrating examples of methods for techniques for downlink scheduling and uplink scheduling in a shared radio frequency spectrum band in accordance with aspects of the present disclosure.

FIG. 14 shows a flowchart illustrating a method 1400 for techniques for DL scheduling and UL scheduling in a shared RF spectrum band in accordance with various aspects of the present disclosure. The operations of method 1400 may be implemented by a UE 115 or its components as described with reference to FIGS. 1 through 9. For example, the operations of method 1400 may be performed by the channel manager as described herein. In some examples, the UE 115 may execute a set of codes to control the functional elements of the device to perform the functions described below.

Additionally or alternatively, the UE 115 may perform aspects the functions described below using special-purpose hardware.

At block 1405, the UE 115 may receive an UL data transmission grant associated with a channel of shared RF spectrum band as described above with reference to FIGS. 1 through 9. In certain examples, the operations of block 1405 may be performed by the transceiver as described with reference to FIG. 7.

At block 1410, the UE 115 may perform a channel readiness procedure associated with the channel as described above with reference to FIGS. 1 through 9. In certain examples, the operations of block 1410 may be performed by the channel manager as described with reference to FIG. 7.

At block 1415, the UE 115 may transmit channel readiness information based on the channel readiness procedure to a base station, the channel readiness information being transmitted via an UL channel of a licensed RF spectrum band different from the shared RF band as described above with reference to FIGS. 1 through 9. In certain examples, the operations of block 1415 may be performed by the transceiver as described with reference to FIG. 7.

Figure 15:
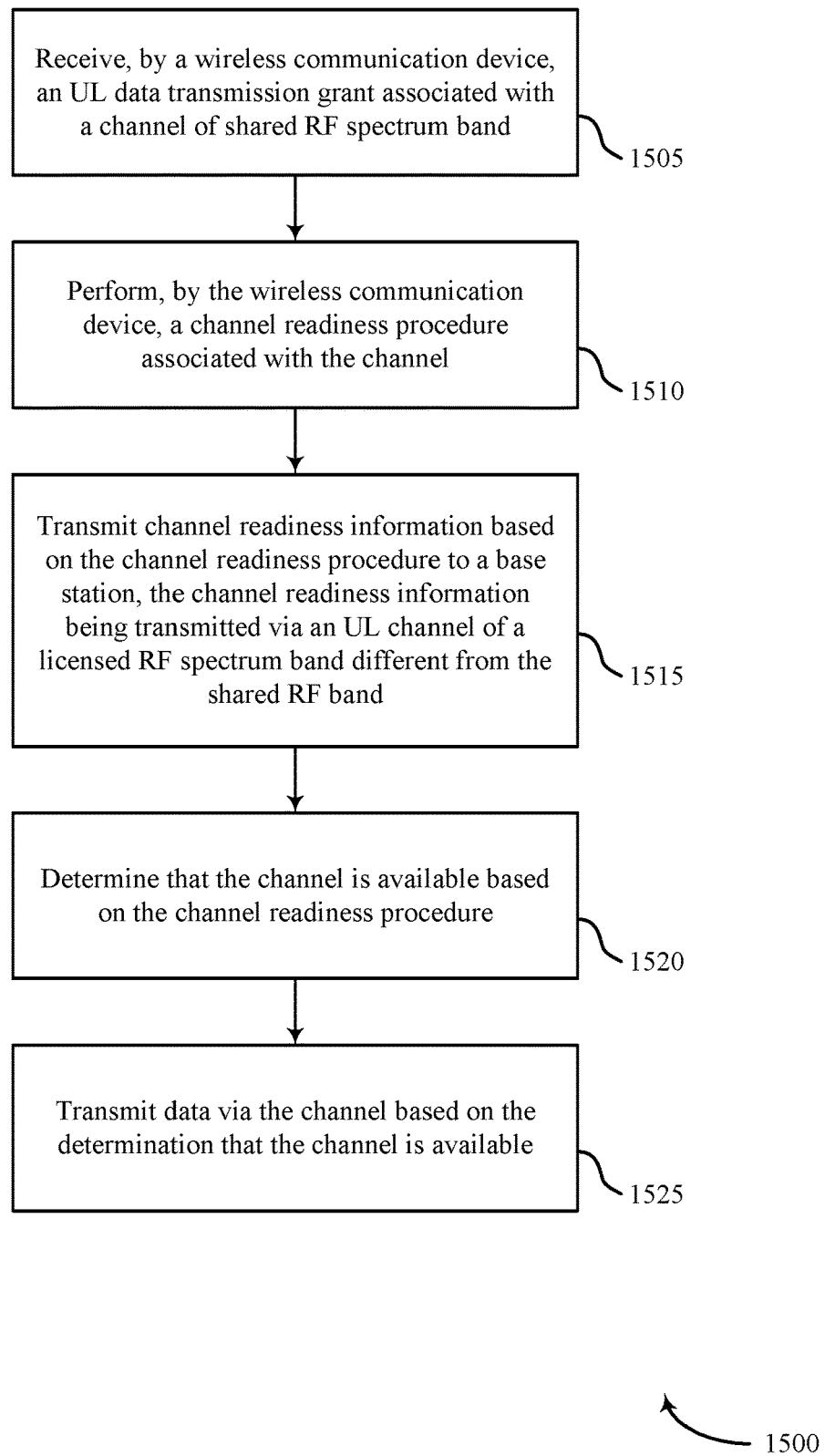

FIG. 15 shows a flowchart illustrating a method 1500 for techniques for DL scheduling and UL scheduling in a shared RF spectrum band in accordance with various aspects of the present disclosure. The operations of method 1500 may be implemented by a UE 115 or its components as described with reference to FIGS. 1 through 9. For example, the operations of method 1500 may be performed by the channel manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may receive an UL data transmission grant associated with a channel of shared RF spectrum band as described above with reference to FIGS. 1 through 9. In certain examples, the operations of block 1505 may be performed by the transceiver as described with reference to FIG. 7.

At block 1510, the UE 115 may perform a channel readiness procedure associated with the channel as described above with reference to FIGS. 1 through 9. In certain examples, the operations of block 1510 may be performed by the channel manager as described with reference to FIG. 7.

At block 1515, the UE 115 may transmit channel readiness information based on the channel readiness procedure to a base station, the channel readiness information being transmitted via an UL channel of a licensed RF spectrum band different from the shared RF band as described above with reference to FIGS. 1 through 9. In certain examples, the operations of block 1515 may be performed by the transceiver as described with reference to FIG. 7.

At block 1520, the UE 115 may determine that the channel is available based on the channel readiness procedure as described above with reference to FIGS. 1 through 9. In certain examples, the operations of block 1520 may be performed by the channel determiner as described with reference to FIG. 7.

At block 1525, the UE 115 may transmit data via the channel based on the determination that the channel is available as described above with reference to FIGS. 1 through 9. In certain examples, the operations of block 1525 may be performed by the transceiver as described with reference to FIG. 7.

Figure 16:
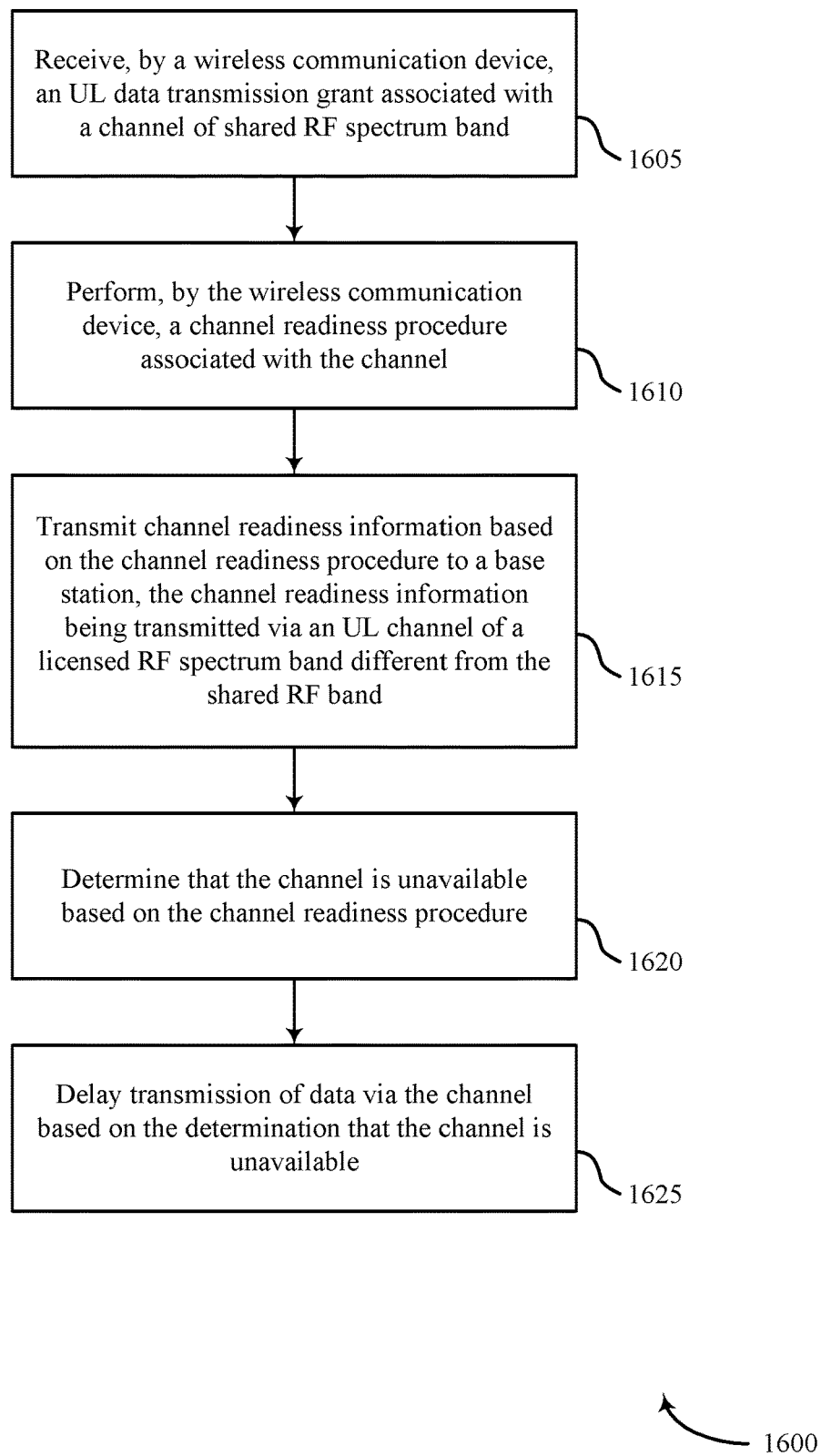

FIG. 16 shows a flowchart illustrating a method 1600 for techniques for DL scheduling and UL scheduling in a shared RF spectrum band in accordance with various aspects of the present disclosure. The operations of method 1600 may be implemented by a UE 115 or its components as described with reference to FIGS. 1 through 9. For example, the operations of method 1600 may be performed by the channel manager as described herein. In some examples, the UE 115 may execute a set of codes to control the functional elements of the device to perform the functions described below. Additionally or alternatively, the UE 115 may perform aspects the functions described below using special-purpose hardware.

At block 1605, the UE 115 may receive an UL data transmission grant associated with a channel of shared RF spectrum band as described above with reference to FIGS. 1 through 9. In certain examples, the operations of block 1605 may be performed by the transceiver as described with reference to FIG. 7.

At block 1610, the UE 115 may perform a channel readiness procedure associated with the channel as described above with reference to FIGS. 1 through 9. In certain examples, the operations of block 1610 may be performed by the channel manager as described with reference to FIG. 7.

At block 1615, the UE 115 may transmit channel readiness information based on the channel readiness procedure to a base station, the channel readiness information being transmitted via an UL channel of a licensed RF spectrum band different from the shared RF band as described above with reference to FIGS. 1 through 9. In certain examples, the operations of block 1615 may be performed by the transceiver as described with reference to FIG. 7.

At block 1620, the UE 115 may determine that the channel is unavailable based on the channel readiness procedure as described above with reference to FIGS. 1 through 9. In certain examples, the operations of block 1620 may be performed by the channel determiner as described with reference to FIG. 7.

At block 1625, the UE 115 may delay transmission of data via the channel based on the determination that the channel is unavailable as described above with reference to FIGS. 1 through 9. In certain examples, the operations of block 1625 may be performed by the channel manager as described with reference to FIG. 7.

Figure 17:
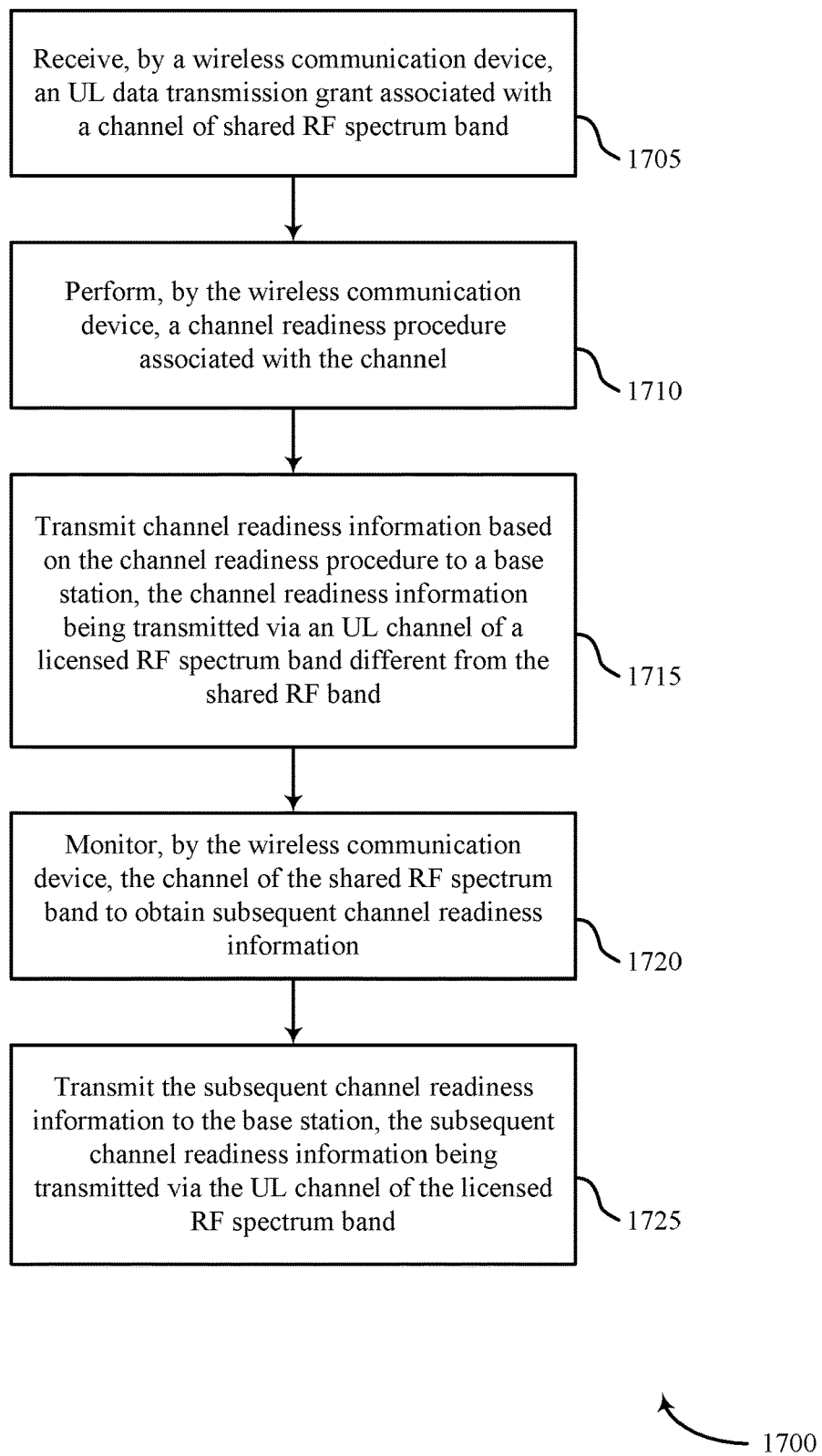

FIG. 17 shows a flowchart illustrating a method 1700 for techniques for DL scheduling and UL scheduling in a shared RF spectrum band in accordance with various aspects of the present disclosure. The operations of method 1700 may be implemented by a UE 115 or its components as described with reference to FIGS. 1 through 9. For example, the operations of method 1700 may be performed by the channel manager as described herein. In some examples, the UE 115 may execute a set of codes to control the functional elements of the device to perform the functions described below. Additionally or alternatively, the UE 115 may perform aspects the functions described below using special-purpose hardware.

At block 1715, the UE 115 may transmit channel readiness information based on the channel readiness procedure to a base station, the channel readiness information being transmitted via an UL channel of a licensed RF spectrum band different from the shared RF band as described above with reference to FIGS. 1 through 9. In certain examples, the operations of block 1715 may be performed by the transceiver as described with reference to FIG. 7.

At block 1720, the UE 115 may monitor the channel of the shared RF spectrum band to obtain subsequent channel readiness information as described above with reference to FIGS. 1 through 9. In certain examples, the operations of block 1720 may be performed by the channel manager as described with reference to FIG. 7.

At block 1725, the UE 115 may transmit the subsequent channel readiness information to the base station, the subsequent channel readiness information being transmitted via the UL channel of the licensed RF spectrum band as described above with reference to FIGS. 1 through 9. In certain examples, the operations of block 1725 may be performed by the transceiver as described with reference to FIG. 7.

Figure 18:
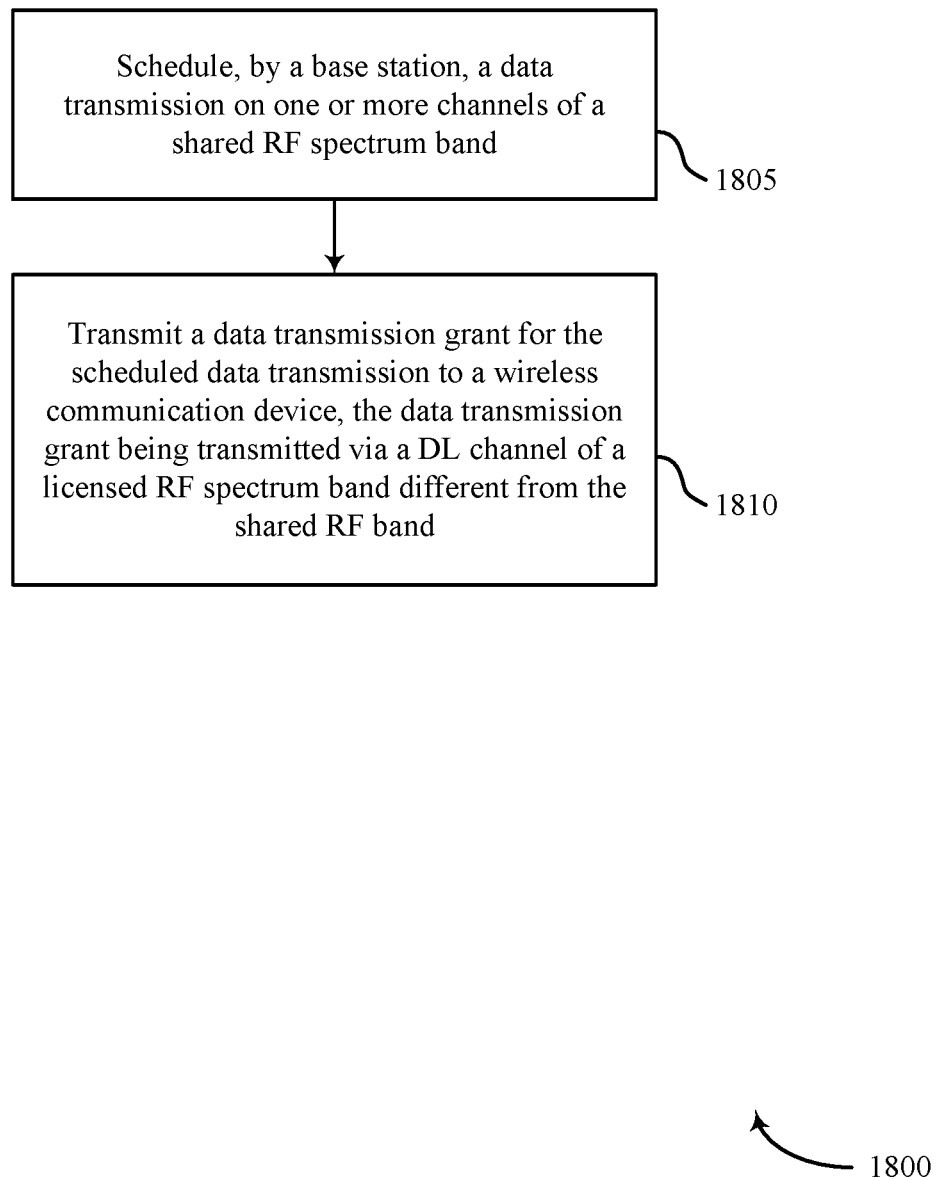

FIG. 18 shows a flowchart illustrating a method 1800 for techniques for DL scheduling and UL scheduling in a shared RF spectrum band in accordance with various aspects of the present disclosure. The operations of method 1800 may be implemented by a base station 105 or its components as described with reference to FIGS. 1-5 and 10-13. For example, the operations of method 1800 may be performed by the data transmission scheduler as described herein. In some examples, the base station 105 may execute a set of codes to control the functional elements of the device to perform the functions described below. Additionally or alternatively, the base station 105 may perform aspects the functions described below using special-purpose hardware.

At block 1805, the base station 105 may schedule a data transmission on one or more channels of a shared RF spectrum band as described above with reference to FIGS. 1-5 and 10-13. In certain examples, the operations of block 1805 may be performed by the data transmission scheduler as described with reference to FIG. 11.

At block 1810, the base station 105 may transmit a data transmission grant for the scheduled data transmission to a wireless communication device, the data transmission grant being transmitted via a DL channel of a licensed RF spectrum band different from the shared RF band as described above with reference to FIGS. 1-5 and 10-13. In certain examples, the operations of block 1810 may be performed by the channel determiner as described with reference to FIG. 11.

Figure 19:
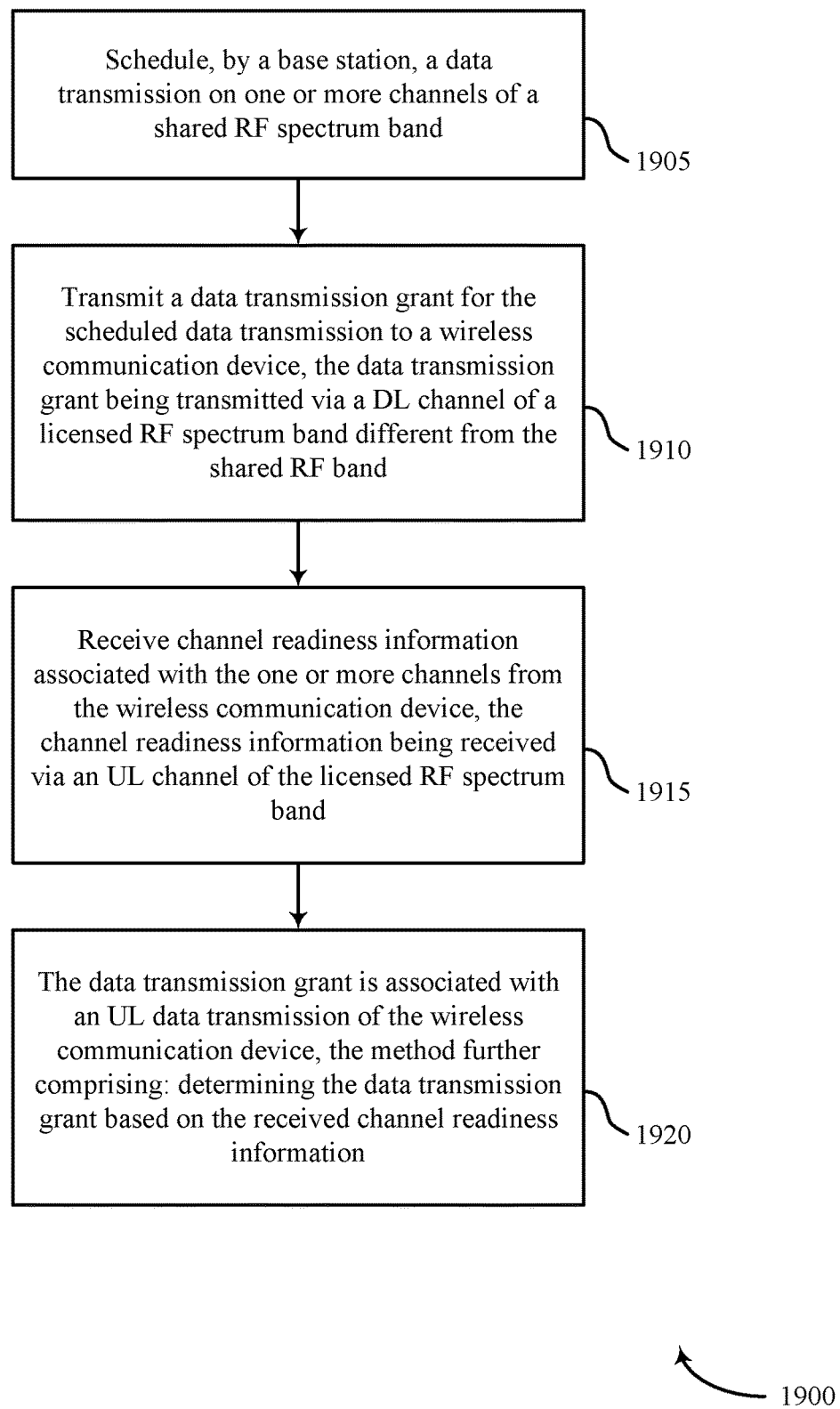

FIG. 19 shows a flowchart illustrating a method 1900 for techniques for DL scheduling and UL scheduling in a shared RF spectrum band in accordance with various aspects of the present disclosure. The operations of method 1900 may be implemented by a base station 105 or its components as described with reference to FIGS. 1-5 and 10-13. For example, the operations of method 1900 may be performed by the data transmission scheduler as described herein. In some examples, the base station 105 may execute a set of codes to control the functional elements of the device to perform the functions described below. Additionally or alternatively, the base station 105 may perform aspects the functions described below using special-purpose hardware.

At block 1905, the base station 105 may schedule a data transmission on one or more channels of a shared RF spectrum band as described above with reference to FIGS. 1-5 and 10-13. In certain examples, the operations of block 1905 may be performed by the data transmission scheduler as described with reference to FIG. 11.

At block 1910, the base station 105 may transmit a data transmission grant for the scheduled data transmission to a wireless communication device, the data transmission grant being transmitted via a DL channel of a licensed RF spectrum band different from the shared RF band as described above with reference to FIGS. 1-5 and 10-13. In certain examples, the operations of block 1910 may be performed by the channel determiner as described with reference to FIG. 11.

At block 1915, the base station 105 may receive channel readiness information associated with the one or more channels from the wireless communication device, the channel readiness information being received via an UL channel of the licensed RF spectrum band as described above with reference to FIGS. 1-5 and 10-13. In some cases, the received channel readiness information can be used for a subsequent data transmission grant during the a subsequent subframe during the same frame as the channel readiness information was received by the base station. For example, the base station 105 may receive channel information from a first wireless communication device, which has reserved the remaining UL subframes of that same frame. The base station 105 may then schedule a subsequent UL transmission grant for the first wireless communication device or a subsequent UL transmission grant for a second wireless communication device based at least in part on the received channel readiness information from the first wireless communication device. In certain examples, the operations of block 1915 may be performed by the channel determiner as described with reference to FIG. 11.

At block 1920, the data transmission grant is associated with an UL data transmission of the wireless communication device, and the base station 105 may further determine the data transmission grant based on the received channel readiness information as described above with reference to FIGS. 1-5 and 10-13. In certain examples, the operations of block 1920 may be performed by the data transmission scheduler as described with reference to FIG. 11.

Figure 20:
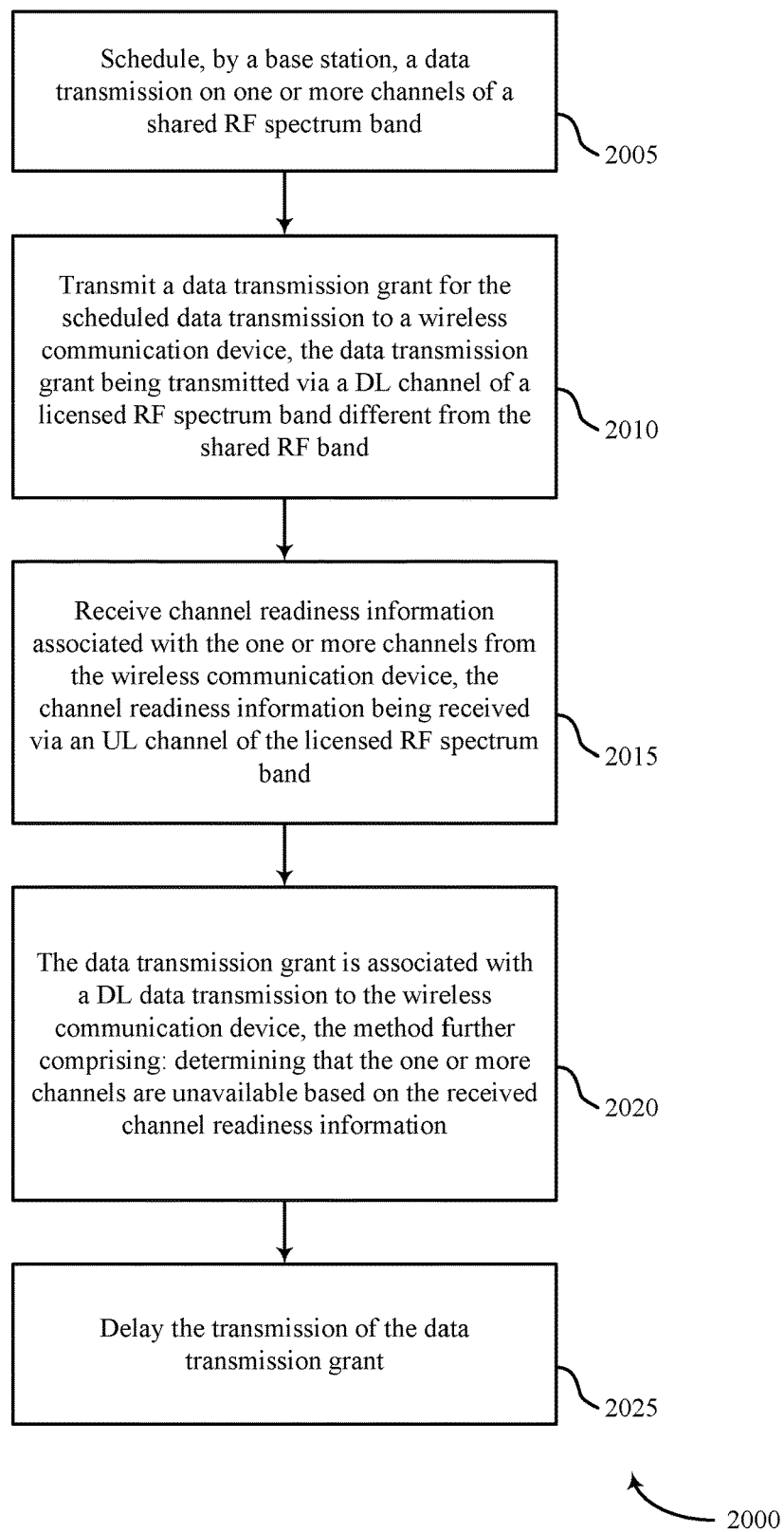

FIG. 20 shows a flowchart illustrating a method 2000 for techniques for DL scheduling and UL scheduling in a shared RF spectrum band in accordance with various aspects of the present disclosure. The operations of method 2000 may be implemented by a base station 105 or its components as described with reference to FIG. 1. For example, the operations of method 2000 may be performed by the data transmission scheduler as described herein. In some examples, the base station 105 may execute a set of codes to control the functional elements of the device to perform the functions described below. Additionally or alternatively, the base station 105 may perform aspects the functions described below using special-purpose hardware.

At block 2005, the base station 105 may schedule a data transmission on one or more channels of a shared RF spectrum band as described above with reference to FIGS. 1-5 and 10-13. In certain examples, the operations of block 2005 may be performed by the data transmission scheduler as described with reference to FIG. 11.

At block 2010, the base station 105 may transmit a data transmission grant for the scheduled data transmission to a wireless communication device, the data transmission grant being transmitted via a DL channel of a licensed RF spectrum band different from the shared RF band as described above with reference to FIGS. 1-5 and 10-13. In certain examples, the operations of block 2010 may be performed by the channel determiner as described with reference to FIG. 11.

At block 2015, the base station 105 may receive channel readiness information associated with the one or more channels from the wireless communication device, the channel readiness information being received via an UL channel of the licensed RF spectrum band as described above with reference to FIGS. 1-5 and 10-13. In certain examples, the operations of block 2015 may be performed by the channel determiner as described with reference to FIG. 11.

At block 2020, the base station 105 may the data transmission grant is associated with a DL data transmission to the wireless communication device, the method may further comprise determining that the one or more channels are unavailable based on the received channel readiness information as described above with reference to FIGS. 1-5 and 10-13. In certain examples, the operations of block 2020 may be performed by the channel determiner as described with reference to FIG. 11.

At block 2025, the base station 105 may delay the transmission of the data transmission grant as described above with reference to FIGS. 1-5 and 10-13. In certain examples, the operations of block 2025 may be performed by the data transmission scheduler as described with reference to FIG. 11.

Figure 21:
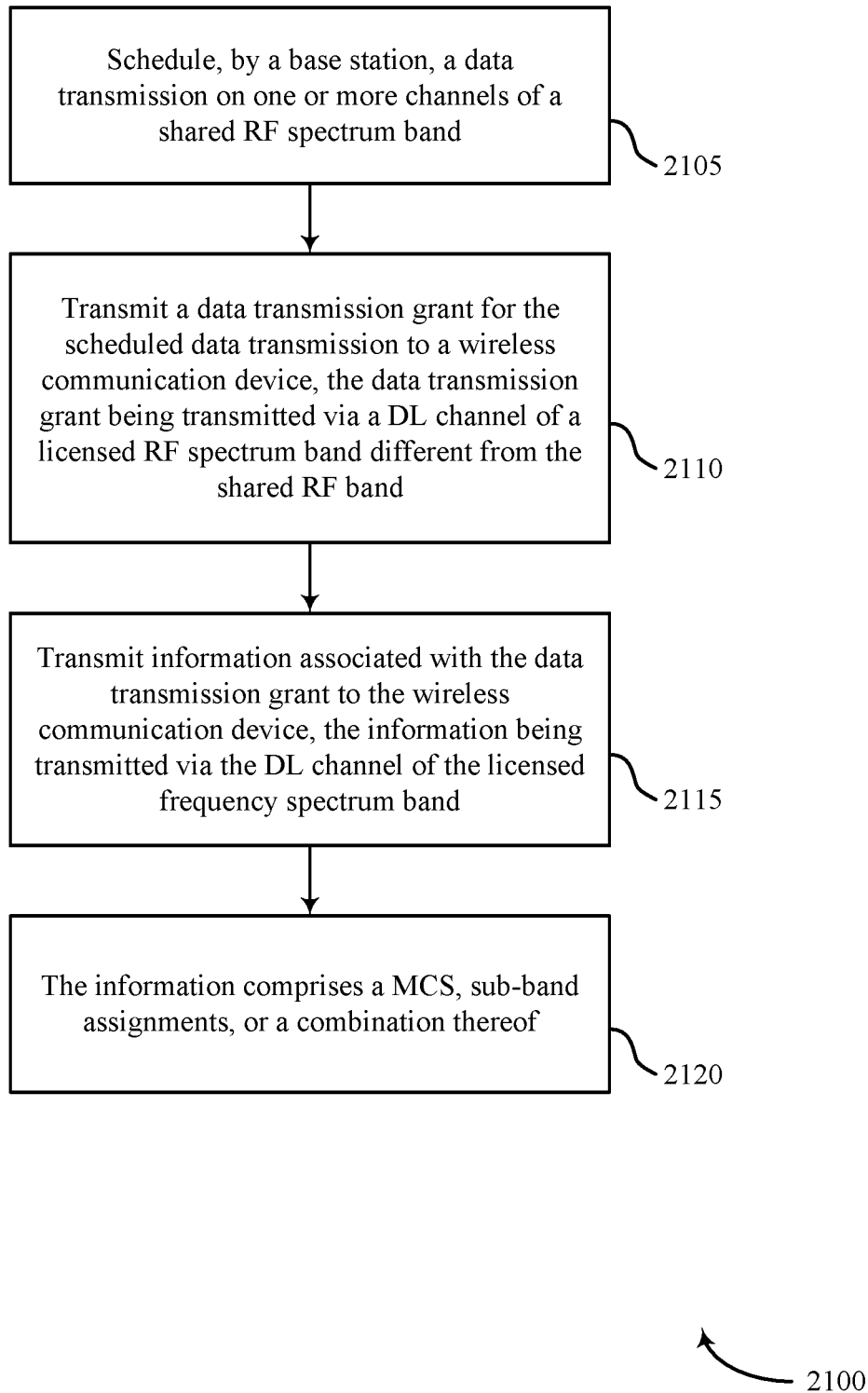

FIG. 21 shows a flowchart illustrating a method 2100 for techniques for DL scheduling and UL scheduling in a shared RF spectrum band in accordance with various aspects of the present disclosure. The operations of method 2100 may be implemented by a base station 105 or its components as described with reference to FIGS. 1-5 and 10-13. For example, the operations of method 2100 may be performed by the data transmission scheduler as described herein. In some examples, the base station 105 may execute a set of codes to control the functional elements of the device to perform the functions described below. Additionally or alternatively, the base station 105 may perform aspects the functions described below using special-purpose hardware.

At block 2105, the base station 105 may schedule a data transmission on one or more channels of a shared RF spectrum band as described above with reference to FIGS. 1-5 and 10-13. In certain examples, the operations of block 2105 may be performed by the data transmission scheduler as described with reference to FIG. 11.

At block 2110, the base station 105 may transmit a data transmission grant for the scheduled data transmission to a wireless communication device, the data transmission grant being transmitted via a DL channel of a licensed RF spectrum band different from the shared RF band as described above with reference to FIGS. 1-5 and 10-13. In certain examples, the operations of block 2110 may be performed by the channel determiner as described with reference to FIG. 11.

At block 2115, the base station 105 may transmit information associated with the data transmission grant to the wireless communication device, the information being transmitted via the DL channel of the licensed frequency spectrum band as described above with reference to FIGS. 1-5 and 10-13. In certain examples, the operations of block 2115 may be performed by the transceiver as described with reference to FIG. 11.

At block 2120, the base station 105 may the information comprises a MCS, sub-band assignments, or a combination thereof as described above with reference to FIGS. 1-5 and 10-13. In certain examples, the operations of block 2120 may be performed by the transceiver as described with reference to FIG. 11.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for techniques for DL scheduling and UL scheduling in a shared RF spectrum band.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDMTM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication comprising:
   scheduling, by a base station, a data transmission on one or more channels of a shared radio frequency spectrum band;
   transmitting a data transmission grant for the scheduled data transmission to a wireless communication device, the data transmission grant for a first subframe of the one or more channels of the shared radio frequency spectrum band and being transmitted via a downlink channel of a licensed radio frequency spectrum band different from the shared radio frequency band; and
   receiving, from the wireless communication device, channel readiness information including reservation information for a second subframe of the one or more channels of the shared radio frequency spectrum band different from the first subframe, the channel readiness information being received via an uplink channel of the licensed radio frequency spectrum band.

2. The method of claim 1, wherein the data transmission grant is associated with an uplink data transmission of the wireless communication device, the method further comprising:
   determining a further data transmission grant based at least in part on the received channel readiness information.

3. The method of claim 1, further comprising:
   determining that the one or more channels are unavailable based at least in part on the received channel readiness information; and
   delaying transmission of a further data transmission grant.

4. The method of claim 1, further comprising:
   transmitting the data transmission grant associated with the one or more channels regardless of a readiness of the one or more channels at a time the data transmission is scheduled.

5. The method of claim 1, further comprising:
   transmitting information associated with the data transmission grant to the wireless communication device, the information being transmitted via the downlink channel of the licensed frequency spectrum band.

6. The method of claim 5, wherein the information comprises a modulation and coding scheme (MCS), sub-band assignments, or a combination thereof.

7. The method of claim 1, wherein the licensed radio frequency spectrum band is long term evolution (LTE) radio frequency spectrum band.

8. An apparatus for wireless communication, comprising:
   a processor;
   memory in electronic communication with the processor; and
   instructions stored in the memory and operable, when executed by the processor, to cause the apparatus to:

schedule a data transmission on one or more channels of a shared radio frequency spectrum band;

transmit a data transmission grant for the scheduled data transmission to a wireless communication device, the data transmission for a first subframe of the one or more channels of the shared radio frequency spectrum band and grant being transmitted via a downlink channel of a licensed radio frequency spectrum band different from the shared radio frequency band; and receive, from the wireless communication device, channel readiness information including reservation information for a second subframe of the one or more channels of the shared radio frequency spectrum band different from the first subframe, the channel readiness information being received via an uplink channel of the licensed radio frequency spectrum band.

9. The apparatus of claim 8, wherein the data transmission grant is associated with an uplink data transmission of the wireless communication device, and wherein the instructions are operable to cause the processor to:

determine a further data transmission grant based at least in part on the received channel readiness information.

10. The apparatus of claim 8, wherein the instructions are operable to cause the processor to:

determine that the one or more channels are unavailable based at least in part on the received channel readiness information; and delay transmission of a further data transmission grant.

11. The apparatus of claim 8, wherein the instructions are operable to cause the processor to:

transmit the data transmission grant associated with the one or more channels regardless of a readiness of the one or more channels at a time the data transmission is scheduled.

12. The apparatus of claim 8, wherein the instructions are operable to cause the processor to:

transmit information associated with the data transmission grant to the wireless communication device, the information being transmitted via the downlink channel of the licensed frequency spectrum band.

13. The apparatus of claim 12, wherein the information comprises a modulation and coding scheme (MCS), sub-band assignments, or a combination thereof.

14. The apparatus of claim 8, wherein the licensed radio frequency spectrum band is long term evolution (LTE) radio frequency spectrum band.

15. An apparatus for wireless communication, comprising:

means for scheduling a data transmission on one or more channels of a shared radio frequency spectrum band;

means for transmitting a data transmission grant for the scheduled data transmission to a wireless communication device, the data transmission grant for a first subframe of the one or more channels of the shared radio frequency spectrum band and being transmitted via a downlink channel of a licensed radio frequency spectrum band different from the shared radio frequency; and means for receiving, from the wireless communication device, channel readiness information including reservation information for a second subframe of the one or more channels of the shared radio frequency spectrum band different from the first subframe, the channel readiness information being received via an uplink channel of the licensed radio frequency spectrum band.

16. The apparatus of claim 15, wherein the data transmission grant is associated with an uplink data transmission of the wireless communication device, the apparatus further comprising:

means for determining a further data transmission grant based at least in part on the received channel readiness information.

17. The apparatus of claim 15, wherein the data transmission grant is associated with a downlink data transmission to the wireless communication device, the apparatus further comprising:

means for determining that the one or more channels are unavailable based at least in part on the received channel readiness information; and means for delaying transmission of a further data transmission grant.

* * * * *